United States Patent [19]

Tonokawa et al.

[11] Patent Number: 4,510,268

[45] Date of Patent: Apr. 9, 1985

[54] DIRECTIONAL FLEXIBILIZATION OF EXPANDED THERMOPLASTIC FOAM SHEET FOR LOW TEMPERATURE INSULATION

[75] Inventors: Hiroshi Tonokawa, Suzuka, Japan; Masao Nakamura, Midland, Mich.

[73] Assignee: The Dow Chemical Company, Midland, Mich.

[21] Appl. No.: 367,183

[22] Filed: Apr. 9, 1982

[51] Int. Cl.³ .............................. B29D 27/00
[52] U.S. Cl. ................... 521/146; 264/321; 264/DIG. 4; 264/DIG. 15; 521/144; 521/145; 521/149; 521/189
[58] Field of Search ........ 264/321, DIG. 4, DIG. 15; 521/146, 145, 149, 189, 144

[56] References Cited

U.S. PATENT DOCUMENTS

| | | | |
|---|---|---|---|
| 3,159,700 | 12/1964 | Nakamura | 264/321 |
| 3,191,224 | 6/1965 | Nakamura | 425/445 |
| 3,206,899 | 9/1965 | Wright | 52/80 |
| 3,244,346 | 4/1966 | Tijunelis | 264/321 X |
| 3,300,558 | 1/1967 | Grant et al. | 264/321 |
| 3,384,531 | 5/1968 | Parrish | 264/321 X |
| 4,017,346 | 4/1977 | Smith | 156/185 |
| 4,299,883 | 11/1981 | Roth et al. | 264/321 X |
| 4,338,072 | 7/1982 | Milford et al. | 264/321 X |

Primary Examiner—Philip E. Anderson
Attorney, Agent, or Firm—R. B. Ingraham

[57] ABSTRACT

Flexibilized, rigid plastic foam sheets with improved properties particularly desirable for low temperature and cryogenic insulation can be prepared by mechanical compression of freshly expanded closed-cell thermoplastic foams. Thus an extruded foam sheet having a density of 20–100 kg/m³, a ȳ-axial size size of 0.05 to 1.00 mm and a Ȳ-axial compressive strength of at least 1.8 kg/cm² is flexibilized with 0.25 to 240 hours of expansion to give a flexibilized foam with improved elongation, workability, crack resistance and water vapor barrier properties.

12 Claims, 20 Drawing Figures

FIG. IA $\overline{YZ}$ PLANE
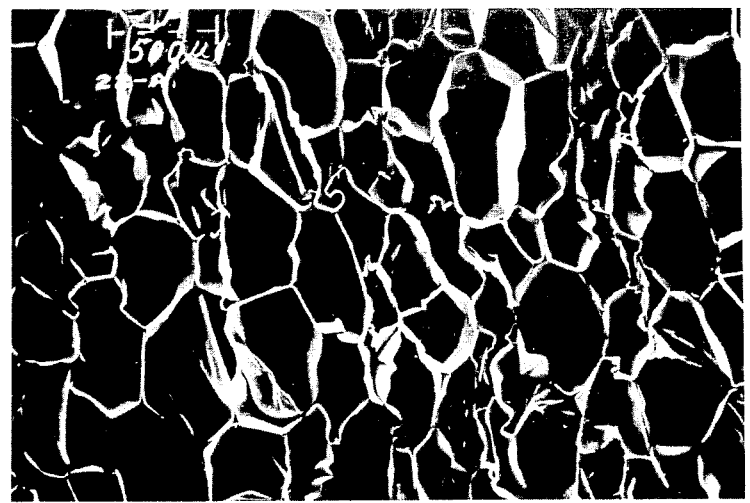
FIG. IB $\overline{XZ}$ PLANE

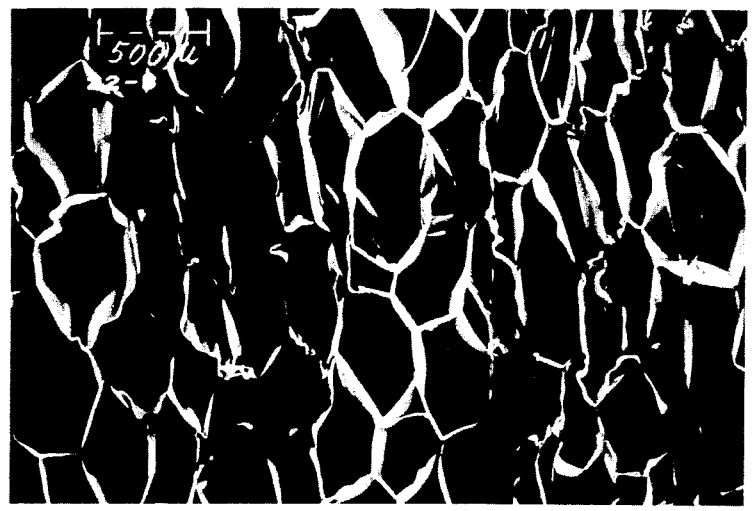
FIG. IC $\overline{XY}$ PLANE

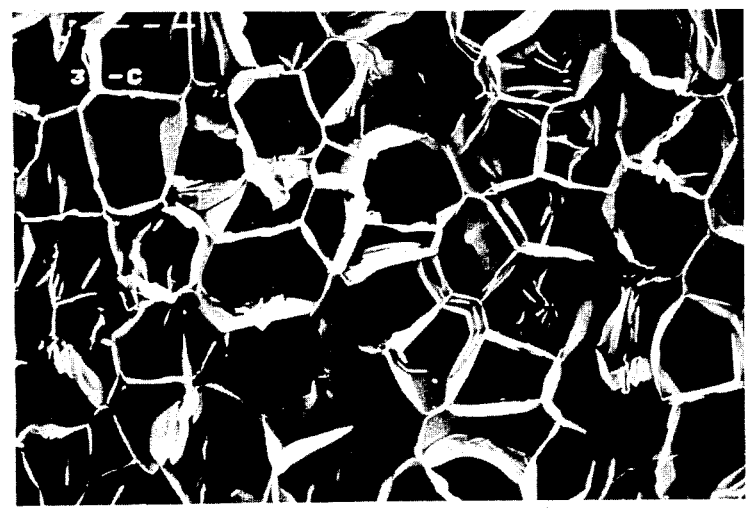
FIG. 2A YZ PLANE
FIG. 2B XZ PLANE

FIG. 2C  $\overline{XY}$ PLANE
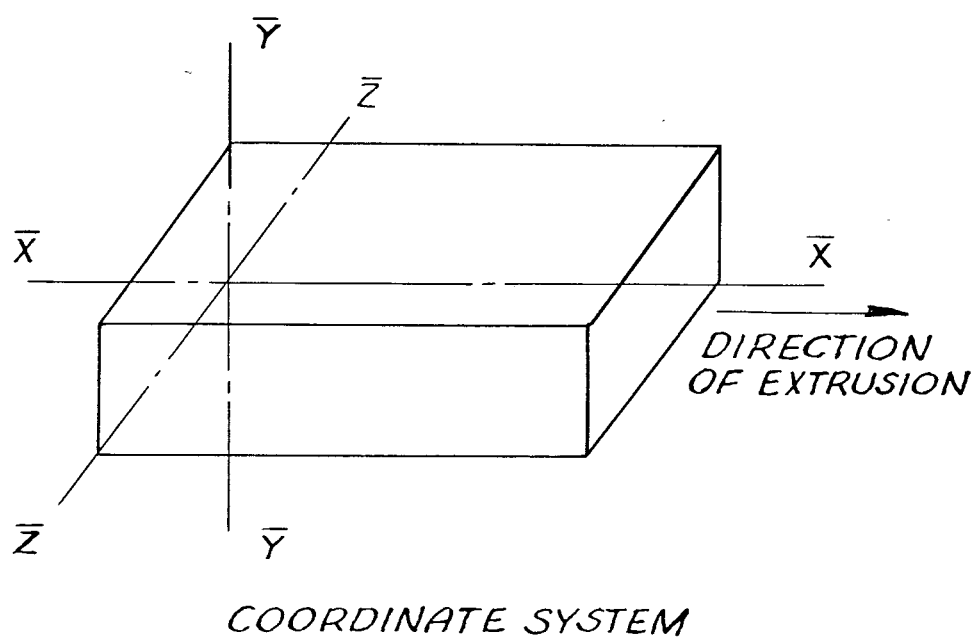
COORDINATE SYSTEM
FIG. 3

DIRECTIONAL FLEXIBILIZATION OF EXPANDED THERMOPLASTIC FOAM SHEET FOR LOW TEMPERATURE INSULATION

BACKGROUND OF THE INVENTION

Rigid closed cell thermoplastic foams have been used extensively as thermal insulating materials because of light weight, good compressive strength and high insulating values. However, their rigidity and inelasticity are adverse factors for application to curved surfaces such as pipe lines and cylindrical or spherical tanks. Cutting pieces to fit or custom molding incur added fabrication problems and costs. Yet, if such foams are forceably applied to a curved surface, the closed cell structure is often cracked or broken resulting in loss of insulation value.

Alternately, Nakamura U.S. Pat. No. 3,159,700 describes a process for directional flexibilization of rigid plastic foam sheets by partial compression or crushing an expanded foam sheet in a direction generally normal to that of desired flexibility. The process is designed to introduce wrinkles into the cell wall of the plastic foam without rupturing the foam cells or causing significant loss of compressive strength in other directions. By repeating the process in a direction substantially at right angles to the first, two-directional flexibilization can be achieved giving a foam product which can assume to a limited degree a compound curvature.

Such properties are particularly valuable for rigid foam sheet to be used for low temperature insulation of pipelines, tanks, and other large vessels for the transportation and storage of low temperature fluids. Furthermore, such flexibilized pieces or sheets of expanded foam are readily assembled by the spiral generation techniques of Wright U.S. Pat. No. 3,206,899 and Smith U.S. Pat. No. 4,017,346.

However, insulating requirements for the transportation and storage of liquid petroleum gas (LPG) and cryogenic fluids such as liquid nitrogen demand even higher long term resistance to water vapor transmission while retaining compressive strength adequate for field application and use. Cell wall cracking and rupture must be reduced to a minimum.

Accordingly, the present invention has for its objects providing a synthetic resin foam which:

(1) can be easily applied to a curved surface and then heated to secure the bent shape;

(2) has improved flexural workability and resistance to cracking, breaking or tearing;

(3) maintains effective, long term compressive strength and insulating properties necessary for low temperature storage and transport of liquefied natural gas and cryogenic fluids; and (4) has high creep resistance and lasting crack resistance in biaxial directions essential to tolerate heavy loads under cryogenic storage conditions.

SUMMARY OF THE INVENTION

It has now been discovered that flexibilized, rigid plastic foam sheets with improved elongation and water vapor barrier properties particularly desirable for low temperature and cryogenic insulation can be prepared by mechanical compression of certain expanded, closed-cell foams having carefully selected structural and physical properties including age after expansion.

More specifically the invention is an improved process for the flexibilization of a rigid, substantially closed-cell plastic foam sheet having a generally rectangular shape defined by the three-dimensional rectangular coordinates $\overline{X}$ (length), $\overline{Y}$ (thickness) and $\overline{Z}$ (width) and the YZ, XZ and XY planes normal thereto by partial crushing the foam sheet in a direction normal to that of desired flexibilization. The improvement is further characterized by (A) selecting a freshly extruded foam sheet having (1) a bulk density of 20–100 $kg/m^3$, (2) an anisotropic cell structure oriented in the $\overline{Y}$ axial direction with an average $\overline{y}$ cell size of 0.05 to 1.00 mm, and (3) a $\overline{Y}$ axial compressive strength of at least 1.8 $kg/cm^2$; (B) compressing said foam sheet within 0.25 to 240 hours of expansion in a short confined compression zone to form a directionally flexibilized foam; and thereafter (C) recovering a directionally flexibilized foam having (1) anisotropically wrinkled cell wall structure with wrinkles oriented in the direction of flexibilization;

(2) average cell sizes $\overline{x}$, $\overline{y}$ and $\overline{z}$ measured in the axial directions $\overline{X}$, $\overline{Y}$ and $\overline{Z}$ satisfying the following conditions: $\overline{y} = 0.05 - 1.0$ mm, and $\overline{y}/\overline{x}$ and $\overline{y}/\overline{z} \geq 1.05$;

(3) a higher elongation at rupture in the direction of flexibilization; and (4) a $\overline{Y}$-axial water vapor permeability of not more than 1.5 $g/m^2 \cdot hr$ by the water method of ASTM C-355. The resulting flexibilized foam has improved flexural workability and crack resistance particularly desirable for low temperature insulation. Indeed with a substantially closed-cell polystyrene resin foam having a bulk density of about 20 to 60 $kg/m^3$, flexibilized foam with a $\overline{Y}$-axial water permeability of less than 1.0 $g/m^2 \cdot hr$ by the water method of ASTM C-355 can be obtained which is stable and effective for long-term insulation of cryogenic storage tanks.

DETAILED DESCRIPTION OF THE INVENTION

Figure 4:
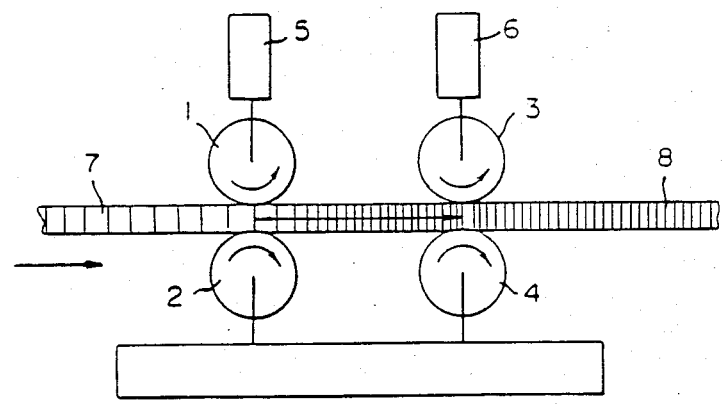

Referring to the drawings, FIGS. 1A, B, C and 2A, B, C are photomicrographs (magnification: 50×) of the one- and two-directionally flexibilized foam of preferred Examples 123 and 223 of the present invention showing the closed cell structure as view in the $\overline{X}$-, $\overline{Y}$- and $\overline{Z}$-axial directions defined in FIG. 3.

As shown in FIGS. 1 and 2, the flexibilized foams of this invention are characterized by an anisotropic cell wall structure in which the wrinkles in the cell wall are directionally oriented. Thus for the one-dimensionally flexibilized foam of FIG. 1, wrinkles in the cell wall observed in the $\overline{X}$-axial direction (FIG. 1A) are significantly fewer than those observed in the $\overline{Y}$- and $\overline{Z}$-axial directions (FIGS. 1B and 1C). For the two-dimensionally flexibilized foam, the cell walls are generally less wrinkled in the $\overline{X}$-axial and $\overline{Z}$-axial directions (FIGS. 2A and 2C) than in the $\overline{Y}$-axial direction (FIG. 2B).

Because of the small size and polyhedral shape of the foam cells, it is difficult to express the distribution and location of such wrinkles accurately in terms of cell structure. For simplicity, such distribution is parametrically observed and described in terms of the three-dimensional coordinate system of FIG. 3. For a typical sheet of extruded thermoplastic foam, the coordinates dimensions $\overline{X}$, $\overline{Y}$ and $\overline{Z}$ correspond to the length in the machine or extrusion direction, thickness and width of the foam sheet, respectively.

The anisotropic wrinkles in combination with the properties of the formulated resin forming the cell walls membranes, the cell size and shape, and the foam density are important parameters of the flexibilized foam. Also such physical properties as axial elongation at rupture and water vapor permeability provide fairly accurate indication of the type, location and distribution of the anisotropic wrinkles.

SYNTHETIC RESIN FOAMS

The present invention is greatly influenced by the properties of the initial expanded foam sheet or planks. Thus the synthetic resin foams used herein must be of substantially closed-cell structure and include foams expanded by extrusion as well as those molded from expandable beads. However, most preferable are extrusion-expanded foam boards of substantially rigid, closed-cell structure. Also important is their density, cell size, compression strength, and thermal resistance which in turn depend on the synthetic resin polymers used in making the initial foams.

Suitable are synthetic resins mainly composed of styrene, vinyl chloride, vinylidene chloride, methyl methacrylate or nylon including copolymers thereof and physical blends of these resins. Preferable for the present invention are resins containing as a major component styrene or a styrenic monomer such as $\alpha$-methyl styrene and o-, m-, p-vinyltoluene and chlorostyrene. Also usable are copolymers of styrene or styrenic monomers and other monomers copolymerizable therewith such as acrylonitrile, methacrylonitrile, methyl acrylate, methy methacrylate, maleic anhydride, acrylamide, vinylpyridine, acrylic acid, and methacrylic acid.

However, more preferably for the present invention are polystyrene resins consisting essentially of only polymerized styrene and, most preferable polystyrene resins containing 0.3 percent by weight or less of residual styrene monomer and 0.5 to 1.5 percent by weight of styrene oligomers, primarily dimer and trimer. Polystyrene resins containing such quantities of styrene monomer and styrene trimer provide expanded foams having particularly uniform distribution of density and cell size as well as improved resistance to repeated compression. Foams from such polystyrene resins are especially well suited for one- and two-directional flexibilization.

To improve toughness, rubber may be blended with such monomers before polymerization or added to the system after polymerization. Further, the foregoing resins may be blended with other polymers so long as the desirable properties of the styrene resins are not adversely affected.

SELECTION OF FOAM SHEETS

To achieve the desired flexibilization and properties essential for low temperature insulation requires careful selection of the initial foam sheets and control of several important properties prior to flexibilization. Thus it has been found essential for the present invention that the synthetic resin foam have (1) a bulk density of about 20 to 100 kg/m$^3$, and preferably about 20 to 60 kg/m$^3$ for one-directional flexibilization (2) a $\overline{Y}$-direction cell size of about 0.05–1.0 mm, and (3) a $\overline{Y}$-axial compressive strength of at least 1.8 kg/cm$^2$.

To examine the interrelation of foam density (kg/m$^3$) and cell size (mm), especially $\overline{Y}$-axial cell size $\overline{y}$, a group of flexibilized foams having varied foam densities and $\overline{Y}$-axial cell sizes were evaluated for $\overline{Y}$-axial compressive strength as a parameter of creep resistance, $\overline{X}$-axial and $\overline{Z}$-axial tensile strengths as parameters of breakage or rupture resistance of the foams in use, variations in the $\overline{X}$-axial and $\overline{Z}$-axial tensile strengths as parameters of the uniformity of performance or quality, and $\overline{Y}$-axial thermal conductivity.

Typical results given below in Tables 1 and 2 and based on an overall evaluation from a series of tests indicate that foams of the present invention must have a bulk density of about 20 to 100 kg/m$^3$, average $\overline{y}$ cell size of 0.05 to 1.0 mm and average cell size ratios $\overline{y}/\overline{x}$ and $\overline{y}/\overline{z} \geq 1.05$. More preferably the foams must be constructed substantially of cells having the major axis thereof more definitely disposed along the $\overline{Y}$-axis with the axial average cell axial size ratios $\overline{y}/\overline{x}$ and $\overline{y}/\overline{z}$ are 1.10 to 4.0. If the average axial cell size ratios $\overline{y}/\overline{x}$ and $\overline{y}/\overline{z}$ exceeds 4, the balance between the dimensional stability, linear expansion coefficient and the tensile strength will be lost.

COMPRESSION FLEXIBILIZATION

Synthetic resin foams having the required bulk density and anisotropic cell structure and size can be flexibilized by compression in one or two axial directions as described in Nakamura U.S. Pat. No. 3,159,700 to provide the high water vapor barrier and other properties desired for low temperature and cryogenic insulation. However, carefully controlled conditions are required.

Figure 5:
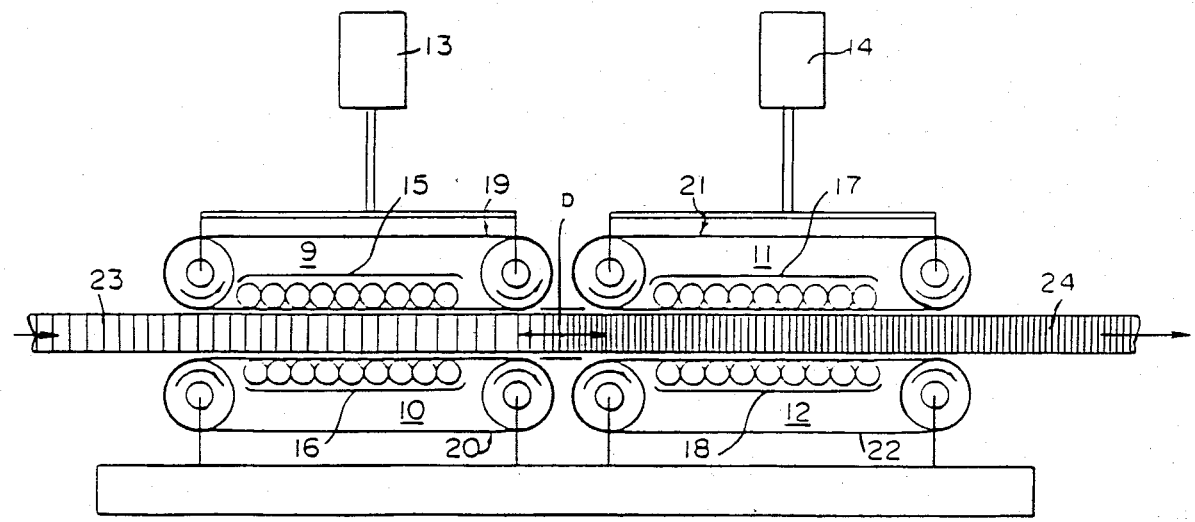

FIGS. 4 and 5 show schematic diagrams of suitable compression equipment of flexibilizers. In the flexibilizer of FIG. 4, there are provided infeed rollers 1, 2 and outfeed rollers 3, 4 spaced longitudinally from each other. The flexibilizer shown in FIG. 5 is provided with infeed belts 9, 10 and outfeed belts 11, 12 which are also spaced longitudinally from each other. These paired rollers or belts hold the expanded foam securely. The reference numerals 5, 6 in FIG. 5 and the reference numerals 13, 14 in FIG. 4 indicate foam holding pressure means which should be controlled accurately because the foam will undergo a significant thicknesswise compression if the pressure is too strong.

In operation the infeed rollers or belts are driven somewhat faster than the second (outfeed) pair so that the foam is compressed in the longitudinal direction in the gap between the infeed and outfeed rollers or belts. According to the present invention, the foam is normally compressed first in the longitudinal ($\overline{X}$-axial) direction. Then if desired, the one-directionally flexibilized sheet can be subjected to compression in another direction at right angle to the longitudinal direction, namely, in the lateral ($\overline{Z}$-axial) direction to provide a more flexible sheet which can assume a compound curvature.

As noted, the flexibilization conditions must be carefully selected and controlled. Particularly important are:

(a) selection of expanded foam plans having uniform quality throughout the sheet;

(b) minimum aging of the foam planks after expansion;

(c) short compression zone; and (d) stepwise compression for flexibilized foams with larger elongation.

A uniform quality for the initial expanded foam sheet is required since the foams are mechanically compressed for flexibilization one-direction at axis by axis a time, e.g., $\overline{X}$-axially first and then $\overline{Z}$-axially, while being held squeezedly $\overline{Y}$-axially. Thus it is necessary that the foams have minimum variation in mechanical properties, especially compressive strength throughout the sheet.

The importance of minimum foam aging after extrusion or expansion and before flexibilization is shown in FIGS. 7 and 8. As described further in Example 3, foam samples aged for varying length of time before flexibilization in the apparatus of FIG. 5 were evaluated for water vapor barrier and foam elongation properties particularly important in the use of the foam for low temperature and cryogenic insulation. These results indicate that the foam should be flexibilized while fresh shortly after initial extrusion, i.e., within 10 days (240 hrs) and preferably 3 days (72 hrs) or less. Indeed, in-line flexibilization shortly after foam extrusion, e.g., after about 0.1 hour to allow for cooling, may be advantageous.

By control of the compression conditions, foam sheets ranging from 10 mm to 300 mm in thickness have been flexibilized without significant loss in $\overline{Y}$-axial compressive strength, water vapor barrier properties and other desired properties. For sheets thicker than about 35 mm the flexibilizer of FIG. 5 is preferred. Elongation of foam processed with this flexibilizer can be controlled by the spacing between the infeed and outfeed belts. For best results, the compression distance D should be about 300 mm at the maximum, and preferably 200 mm or less, with a compression duration of at least one second. Line speeds of 5 to 40 m/min can be achieved with good results.

For thicker insulation, flexibilized sheets can be laminated in desired configurations using a small amount of an adhesive applied sporadically to minimize the effect of the adhesive on the properties of the laminated foams.

FLEXIBILIZED FOAM FOR LOW TEMPERATURE INSULATION

Flexibilization essential herein is achieved by the controlled introduction of anisotropically oriented wrinkles in the foam cell walls in a manner that does not unduly weaken the integrity of the foam or crack the cell walls and cause loss of thermal insulation and water vapor barrier properties. Since the foam cells are very small and have polyhedral shapes, it is very difficult to define the location of such wrinkles accurately in terms of cell shape and structure. However, the $\overline{Y}$-axial water vapor permeability of the flexibilized foam indicates cracking or breakage of the cell walls. Also the percentage elongation at rupture in the three axial directions is a measurable parameter of the extensibility, location and distribution of the wrinkles. Typical results are given in the Examples, and particularly Tables 3 and 4.

From Tables 3 and 4, it will be obvious that the foams contemplated by the present invention must have a $\overline{Y}$-axial water vapor permeability Py equal to or smaller than 1.5 g/m²·hr to prevent or minimize deterioration in thermal-insulating properties over long use. More preferably, the water vapor permeability should be 1.0 g/m²·hr or less.

In addition to the $\overline{Y}$-axial water vapor permeability of the flexibilized foams, the elongation at rupture in the three axial directions are useful parameters of extensibility, location and distribution of wrinkles and suitability for applications involving such severe conditions as encountered in liquid nitrogen storage tanks. Evaluation of the variations in the $\overline{X}$-axial and $\overline{Z}$-axial elongations at rupture shows the uniformity of the extensibility throughout the foam while the change in $\overline{Y}$-axial thermal conductivity with time reflects loss of thermal-insulating properties from moisture absorption after prolonged use under $\overline{Y}$-axial loads. Also, cryogenic tests at about $-160°$ C. and $-196°$ C. show the crack resistance of the foam when used as thermal-insulation for liquefied natural gas and nitrogen tanks.

The preferred polystyrene foams exhibit excellent properties as cryogenic insulation even without cladding reinforcement. Their bendability and thermoformability are particularly advantageous for field construction. To minimize multi-axial strains of the foams after application or to improve thermal properties, two or more such foams may be bonded to form foam logs with biaxial extensibility. Also, they may be clad with metal foils or they may be combined with synthetic resin films having high gas barrier properties.

The present invention also provides improved synthetic resin foams which can be applied to small-diameter pipes by adjusting the extensibility of the foams in the bending direction in accordance with the pipe outside diameter and the foam thickness. Other tests with 114 mm outside diameter pipes confirmed the applicability of the one- and two-dimensionally flexibilized foam sheet to a variety of curved surfaces including pipes and cylindrical and spherical tanks regardless of curvature.

Such tests are representative of the bendability, applicability to curved surfaces, cryogenic insulating properties, and other characteristics required for practical use of such foams. Indeed, the flexibilized foams of the present invention are significantly improved over prior art foam products. They are becoming increasingly important as thermal insulation for transportation and storage of LNG, for cold storage of foods, and for exterior walls of buildings. These foams provide effective thermal-insulation that can be applied easily to such structures in the field.

The present invention will be further illustrated by the following preferred and reference examples using the procedures and tests described below. Unless otherwise specified, all parts and percentages are by weight.

POLYSTYRENE RESINS

The polystyrene resins used for the extruded foam sheets were selected from commercial stock after analysis for residual volatiles (primarily styrene and ethylbenzene) and oligomers (styrene dimer and trimer) by gas chromatography using a flame ionization detector. For the oligomers, the resin is dissolved in methyl ethyl ketone, the polymer precipitated with methanol, and the supernatant liquid analyzed. These resins had an intrinsic viscosity of about 0.83 measured in toluene solution at 30° C.

EXTRUDED FOAM SHEETS

The polymers were expanded into a rigid, substantially closed-cell foam with an extrusion-foaming system composed of a screw extruder, blowing agent blending feeder, cooler and board-forming die. More specifically, a mechanical blend of 100 parts of the polystyrene resin, 2 parts of a flame retardant and 0.03 to 0.1 part of a nucleator is continuously fed into the extruder with 12 to 17 parts of a 50/50 mixture of dichlorodifluoromethane/methyl chloride as a blowing agent. The thermoplastic mixture is kneaded under pressure, cooled to an extrusion temperature of about 90° to 118° C. and then extruded through a die and expanded into a foam. The extrusion conditions were controlled so that the foam was about 110 mm×350 mm in cross-section and the axial cell size ratios $\overline{y}/\overline{x}$ and $\overline{y}/\overline{z}$ were about 1.1 to 1.25 and 1.1 to 1.17, respectively. The $\overline{Y}$-axial cell size and bulk density D were varied in the range of 0.07 to 1.6 mm and about 21.5 to 77 kg/m³, respectively. Foams lighter than about 21 kg/m³ were subjected to secondary expansion by steam at 100° C. for 2 to 6 minutes. The resultant foams have a bulk density of about 15.5 to 20 kg/m³. Analysis showed essentially no loss of residual volatiles or oligomers in the extrusion process.

DIRECTIONAL FLEXIBILIZATION

Skins were removed from the freshly extruded foams to obtain skinless foam boards about 100 mm×300 mm in cross-section and 2,000–4,000 mm in length. These foam planks were mechanically compressed for flexibilization in the of $\overline{X}$-axial direction and then for two-directional flexibility in the $\overline{Z}$-axial direction using the equipment shown in FIG. 5. Typical conditions for the compression process were:

| Aging before compression: | 1 day |
|---|---|
| Plank thickness: | 100 mm |
| Infeed belt speed: | 12 m/min. |
| Infeed/outfeed speed ratio: | 25/21–28/21 |
| Compression distance D (See FIG. 5): | 200 mm |
| Compression duration: | 3.6 sec. |
| Cycles of compressions: | 1–3 |

TEST PROCEDURES

The resulting flexibilized foam planks are then evaluated by standard test procedures. Individual test results are rated on a general scale as:

| Good (GO) | Desired or target foam quality |
|---|---|
| Passable (PA) | Conventional foam quality |
| Unacceptable (UN) | Below acceptable foam quality | and then an overall composite evaluation rating is made on the scale:

| Excellent (EX) | Rated Good in all tests |
|---|---|
| Good (GO) | Rated Good/Passable in all tests |
| Passable (PA) | Rated Passable in all tests |
| Unacceptable (UN) | Rated Unacceptable in at least one test |

(1) Foam Density

Standard test samples, normally a 50 mm cube or a 25 mm×100 mm×100 mm sheet are cut from the center parts of the skinless foam board and their weight (g) and volume (cm³) determined and the foam density calculated from the average of at least three specimens. The density variation calculated by the formula:

$$\text{Density variation} = \frac{\text{Max. density} - \text{Min. density}}{\text{Avg. density}} \times 100$$

provides a useful measure of foam uniformity:

| Rating | Density Variation |
|---|---|
| Good | <10% variation in density |
| Passable | 10–15% variation |
| Unacceptable | >15% variation |

(2) Average Cell Size and Shape

The $\overline{X}$-axial, $\overline{Y}$-axial and $\overline{Z}$-axial average cell sizes $\overline{x}$, $\overline{y}$ and $\overline{z}$ in terms of the coordinates of FIG. 3 are measured by the method of ASTM D-2842 using nine specimens cut in the prescribed manner. Then as parameters of cell shape, the ratios of the $\overline{Y}$-axial average cell size $\overline{y}$ versus $\overline{X}$-axial and $\overline{Z}$-axial average cell sizes $\overline{x}$ and $\overline{z}$ are calculated.

The average cell size variation provides a measure of foam uniformity on the following evaluation scale:

| Rating | Density Variation |
|---|---|
| Good | <35% variation in cell size |
| Passable | 35–45% variation |
| Unacceptable | >45% variation |

(3) Compressive Strength

A total of six to twelve 50 mm cubes are cut from each foam in a standard pattern and each specimen is subjected to axial compressive strength test in the non-flexibilized direction in accord with ASTM D-1621. The resulting average compressive strength is evaluated on the following scale:

| Rating | Average Compressive Strength (kg/cm²) | |
|---|---|---|
| Good | $\overline{Y}$-axial: 2.2+ | $\overline{X}$-axial: 1.1+ |
| Passable | $\overline{Y}$-axial: 1.8–2.2 | $\overline{X}$-axial: 0.9–1.1 |
| Unacceptable | $\overline{Y}$-axial: <1.8 | $\overline{X}$-axial: <0.9 |

(4) Tensile Strength and Variation

From a skinless foam board, twelve 50 mm cubic specimens are cut in a standard pattern. In accordance with ASTM D-1623 B, each specimen is subjected to X-axial tensile strength test with a jig or loading fixture attached to each end. The measured strength $S_1$ through $S_{12}$ are averaged and the tensile strength variation is calculated as follows:

$$X\text{-axial average tensile strength} = \frac{\sum_{i=1}^{12} S_i}{12} \text{ (kg/cm}^2\text{)}$$

$$\text{Tensile strength variation} = \frac{\text{max. strength} - \text{min. strength}}{\text{average strength}} \times 100(\%)$$

Likewise, the Z-axial average tensile strength and variation thereof are measured on another twelve specimens.

| Rating | Tensile Strength | % Variation |
|---|---|---|
| Good | 1.2+ kg/cm² | <20% |
| Passable | 1.0–1.2 kg/cm² | 20–40% |
| Unacceptable | <1.0 kg/cm² | >40% |

(5) Percent Elongation at Rupture

In accordance with ASTM D-1623B, the three groups of 12 specimens, each a 50 mm cube, were subjected to X-axial, Y-axial and Z-axial tensile strength test, respectively, to determine their elongations at rupture Gx, Gy and Gz, from which the percentage elongations at rupture Ex, Ey and Ez were calculated by using the following formula, respectively:

Percentage elongations at rupture (*Ex, Ey, Ez*) =

-continued $$\frac{Gx, Gy, Gz \text{ (mm)}}{50 \text{ (mm)}} \times 100 \, (\%)$$

Then, for the respective specimen groups, the average percentage elongations at rupture $\overline{Ex}$, $\overline{Ey}$ and $\overline{Ez}$ and their variations were calculated by the following formulas:

$$\text{Average percentage elongations at rupture } (\overline{Ex}, \overline{Ey}, \overline{Ez}) = \frac{\sum_{i=1}^{12} (Ex, Ey, Ez)}{12} \%$$

$$\text{Variation in percentage elongation at rupture} = \frac{\text{max. percentage elongation} - \text{min. percentage elongation}}{\text{average percentage elongation } (\overline{Ex}, \overline{Ey}, \overline{Ez})} \times 100(\%)$$

where max. and min. percentage elongations are for each axis.

| Rating | % Variation in Elongation at Rupture |
| --- | --- |
| Good | <20% |
| Passable | 20–40% |
| Unacceptable | >40% |

Also, it is useful to calculate the ratios Ex/Ey and Ez/Ey as further measure of the foam quality.

(6) Thermal Conductivity

A flexibilized foam board is cut into specimens each 200 mm square and 25 mm thick. Each specimen is then aged in a chamber partially filled with water and held at 27° C. The specimen is secured in the chamber about 30 mm above the water surface and a cold plate cooled to 2' C. by recirculated cooled water is brought into tight contact with the top surface of the specimen. After aging for 14 days, the specimen is taken out and its surface is wiped lightly with gauze. The thermal conductivity λ' of the aged specimen is measured in accordance with ASTM C-518 and the ratio of λ' to the initial thermal conductivity λ of the specimen before aging is calculated.

| Rating | Thermal Conductivity Change (λ'/λ) |
| --- | --- |
| Good | <1.07 |
| Passable | 1.07–1.12 |
| Unacceptable | >1.12 |

(7) Water Vapor Permeability

Three circular specimens each 80 mm across and 25 mm thick are cut from each flexibilized foam and the water vapor permeability of the specimens is measured in accordance with ASTM C-355 using distilled water. From the measurements, the water vapor permeability is calculated by using the following formula:

$$\text{Water vapor permeability} = \frac{G}{A \times t} \, (g/m^2 \cdot hr)$$

where:
G ... change in specimen weight (g)
A ... area subjected to water vapor transmission (m$^2$)
t ... time in which the specimen weight changes by G gram (hr)

For low temperature insulation, a water vapor permeability of less than 1.5, and preferably less than 1.0 g/m$^2$.hr, is most desirable.

(8) Cryogenic Tests

Figure 10:
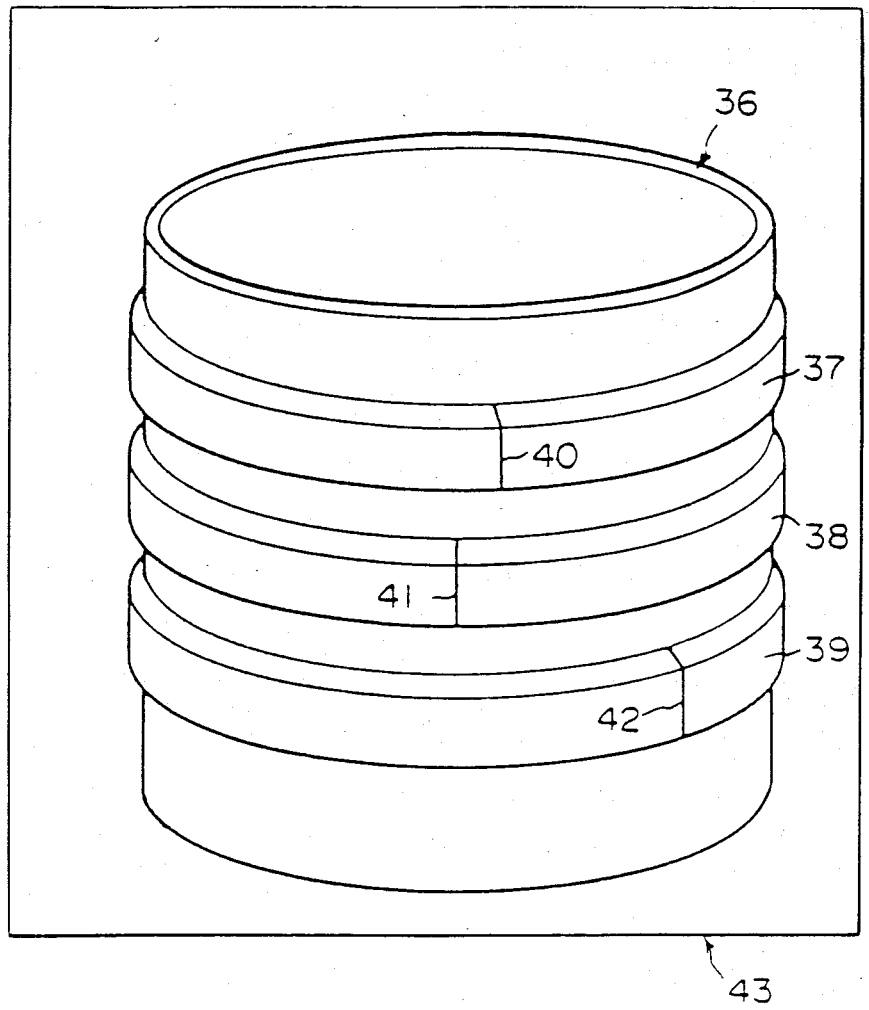

A. Three 20 mm×100 mm×1750 mm specimens were prepared from a flexibilized foam board and wound around a stainless steel pipe 36 and their opposite end faces ($\overline{YZ}$ faces) were butt-welded together as shown at 40, 41 and 42 in FIG. 10. The the pipe specimens were quickly immersed in a cryostat filled with liquid nitrogen so that all specimens were well under the liquid surface. After being immersed for 5 hours, they were taken out of the cryostat and left at a room temperature for 5 hours. After 4 cycles of such treatment, the three specimens were carefully observed for any visual changes including cracks, fractures or ruptures.

Good ... No visible fractures or cracks
Unacceptable ... cannot wind without fracturing B. In another test, flexibilized foam specimens 50 mm thick, 170–270 mm wide and 300 mm long were smoothed by machining the top and bottom surfaces. After marking the $\overline{X}$ and $\overline{Z}$ axes on the edges, each piece was covered top and bottom with 12 mm thick plywood (conforming to Japanese Agricultural Standard) using a commercial cryogenic polyurethane adhesive (Sumitac EA90177 produced by Sumitomo Bakelite Co., Ltd., Japan) to the joint surfaces. The adhesive was cured by placing the test panel under pressure of 0.5 kg/cm$^2$ for 24 hours at 23° C.

1. Cryogenic Test at −160° C.

Each cryogenic test panel 34 is placed in a liquid nitrogen cooled cryostat box having an internal temperature controlled to −160° C.±5° C. by controlled addition, gasification and diffusion of liquid nitrogen. After 5 hours, the test panel is quickly removed and left at room temperatures for about 1 hour. This process is repeated 4 cycles. After the last cycle, the test panel is visually checked for cracks in the four exposed faces of the foam specimen. Then one hour after removal from the cryostat, the plywood covers are removed with a slicer. Then a 10 mm thick slice of the foam is cut from the top surface and a mixture of a surfactant and colorant in water is applied to the surfaces of the cut foam to show any cracks formed therein.

2. Cryogenic Test at −196° C.

For this test, a cryogenic box partially filled with a liquid nitrogen is used. The plywood faced test panels are submerged in the liquid nitrogen and placed on triangular steel supports fixed to the bottom of the box. A steel weight precooled in liquid nitrogen is placed on the test panel top, and the panel held immersed for 30 minutes. Then the test panel is taken out and left at room temperature for one hour under forced ventilation. After repeating the foregoing process for four or more cycles, checks is made for surface and internal cracks in the manner described above in test B(1).

| Rating | Observation |
| --- | --- |
| Good | No visible damage or cracks |
| Passable | Fine cracks |
| Unacceptable | Ruptures or large cracks |

(9) Cryogenic Pipe Insulation

Figure 11:
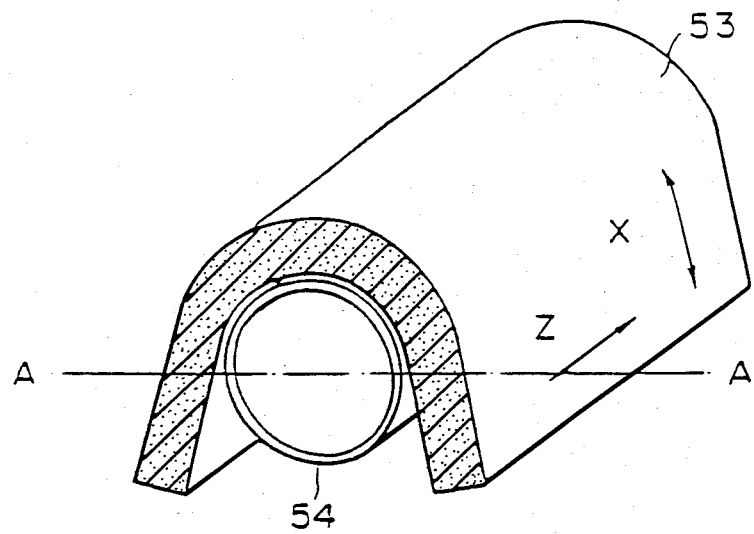

A. Bendability Three pieces of flexibilized foam 200 mm wide, 500 mm long and 25, 37.5 and 75 mm thick are bent to the curvature of a steel pipe 54 about 114 mm in outside diameter by applying a bending stress Y-axially thereto with its Z-axis disposed in parallel with the axis of the pipe 54, as shown in FIG. 11. The specimen is bent until it is brought into close contact with the outer peripheral surface of the pipe over an area exceeding the outer surface area of a semicylindrical half section of the pipe (the section above the center line A—A shown in FIG. 11).

| Rating | Observation |
|---|---|
| Good | Bends easily without cracks |
| Passable | Bends with careful attention |
| Unacceptable | Breaks |

Figure 12:
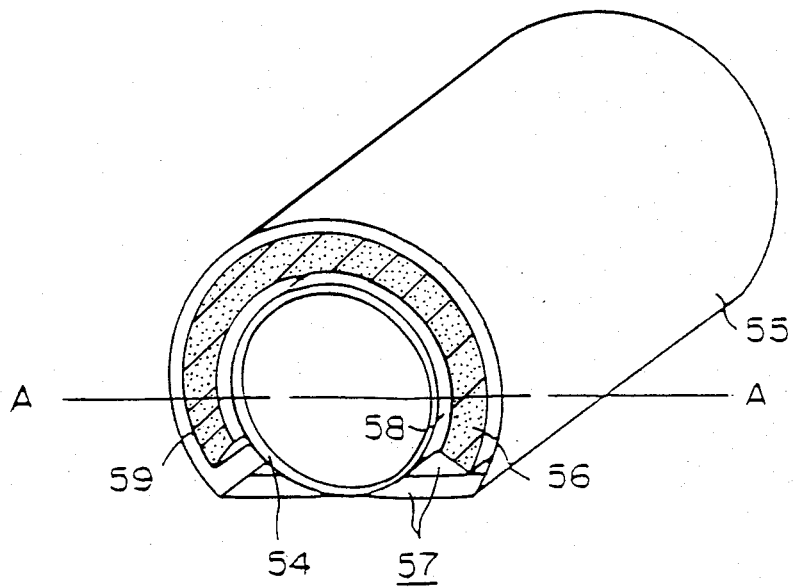

B. Thermoformability The flexibilized foam pieces are bent to the outside curvature of the steel pipe 54 about 114 mm in outside diameter with its Z-axis disposed along the axis of the pipe. Markings are put on the cut edge of the pipe 54 diametrically oppositely along the center line A—A shown in FIG. 12. The bent specimen 56 is then totally covered with a galvanized, 0.3 mm thick sheet iron 55 and the opposite side ends of the foam specimen held with tensioning bands 57. Then the covered specimen 56 is placed in a hot-air oven with the tensioning bands 57 down and heated at 85° C. for 45 minutes. After being removed from the oven, the specimen is cooled at room temperature for two hours. Then, the galvanized cover 55 is removed and the gaps 58 and 59 from the outer ends of the foregoing markings to the intersections of the center line A—A and the inner wall of the specimen 56 are measured and rated as follows:
Good: Average gap <5 mm
Passable: Average gap 5-10 mm
Unacceptable: Average gap >10 mm C. Thermal Insulation Test Pieces of flexibilized foam cut to a 37.5 mm×200 mm×500 mm size are thermoformed as above in two layers and then cut Z-axially to provide inner and outer semicylindrical thermal insulation covers for a 114 mm o.d. pipe. The test cover pieces are then fit to a 114 mm o.d. stainless steel pipe about 800 mm long with flanges at each end and secured with a cryogenic polyurethane adhesive. The joints of the outer covers are staggered from those of the inner cover. The entire section is then coated with a 2.5 mm thick waterproof layer of polyurethane mastic. After 4 days aging, the covered pipe is connected to a cryogenic test line and filled with liquid nitrogen. The interior of the stainless steel pipe is maintained at −196° C. for 6 hours. Thereafter, the liquid nitrogen is discharged and the covered pipe left for 12 hours at 23° C. and 80% R.H. The foregoing test cycle is repeated four times while observing the surface conditions of the waterproof layer 66 including water condensation and icing.
The results are evaluated as follows:
Good: No visible surface change
Passable: Brief spots of moisture condensation
Unacceptable: Icing or extensive condensation Immediately after the above tests, the waterproof coating and foam insulation layers are carefully removed and visually examined for cracks using a colorant solution if necessary.
Good: No visible damage or cracks
Passable: Fine cracks
Unacceptable: Ruptures or large cracks

EXAMPLE 1

One-Direction Flexibilization

Using a commercial polystyrene resin containing 0.20 weight percent residual volatiles including styrene monomer and 0.87 weight percent oligomers including styrene trimer (herein PS Resin A), a variety of foam planks were prepared for one-directional flexibilization. The extrusion conditions were controlled to give a foam sheet about 110 mm×350 mm in cross-section with a bulk density of about 21.5 to 60 kg/m$^3$. Skins were removed from each of the foams and the resulting foam board was cut into three smaller planks each 100 mm square and 4,000 mm long.

Preferred Examples 101–112; Reference Examples R101–107

After aging one day, the foam planks were flexibilized by compression in the machine direction ($\overline{X}$-axis) using the equipment of FIG. 5 and the typical conditions described in the procedures above. The flexibilized foam planks of the preferred Examples 101–112 were evaluated for density, $\overline{Y}$-axial cell sizes, cell shapes represented by $\overline{y}/\overline{x}$ and $\overline{y}/\overline{z}$, compression strengths ($\overline{Y}$-axial and $\overline{Z}$-axial), $\overline{X}$-axial tensile strengths and elongation at rupture with the results shown in Table 1. In these examples, the axial cell size ratios $\overline{y}/\overline{z}$ were in the range of 1.00 to 1.25.

For comparison other foams expanded from PS Resin A but lacking in desired foam characteristics were flexibilized in a similar manner with results shown in Table 1 as Reference Examples.

TABLE 1

| | | | | One-Directional Flexibilization | | | | |
|---|---|---|---|---|---|---|---|---|
| Preferred Example No. | Density (kg/m$^3$) | Y-axial Cell Size $\overline{y}$ (mm) | Cell Shape $\overline{y}/\overline{x}$ | Compressive Strength Y-axial | Compressive Strength Z-axial | X-axial Elongation Variation | X-axial Tensile Strength Variation | Overall* Evaluation |
| 101 | 32.3 | 0.53 | 1.57 | Go | Go | Go | Go | Ex |
| 102 | 41.4 | 0.80 | 1.57 | Go | Go | Go | Go | Ex |
| 103 | 23.3 | 0.80 | 1.55 | Go | Go | Go | Go | Ex |
| 104 | 43.0 | 1.00 | 1.50 | Go | Go | Pa | Pa | Go |
| 105 | 40.2 | 0.99 | 1.53 | Go | Go | Pa | Pa | Go |
| 106 | 20.0 | 1.00 | 1.55 | Pa | Pa | Pa | Go | Go |
| 107 | 41.5 | 0.26 | 1.58 | Go | Go | Go | Go | Ex |
| 108 | 60.0 | 0.10 | 1.45 | Go | Go | Pa | Pa | Go |
| 109 | 25.9 | 0.11 | 1.50 | Go | Go | Go | Go | Ex |
| 110 | 23.0 | 0.10 | 1.47 | Go | Go | Pa | Go | Go |
| 111 | 30.1 | 0.08 | 1.51 | Go | Go | Go | Go | Ex |
| 112 | 56.8 | 0.07 | 1.46 | Go | Go | Go | Go | Ex |

*Ex - Excellent;
Go - Good;
Pa - Passable;
Un - Unacceptable

Figure 6A:
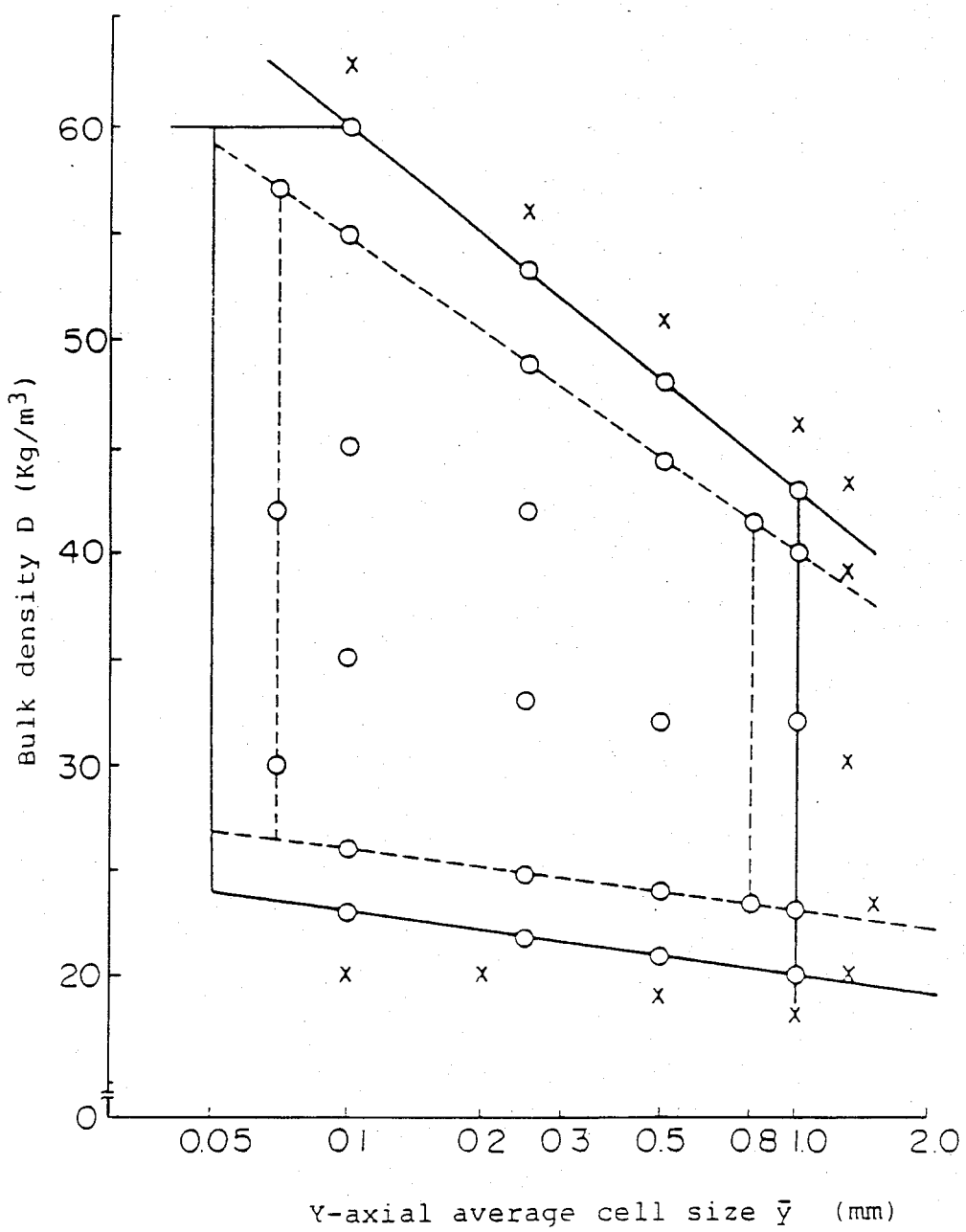

Based on results as shown in Table 1, the foam bulk densities were plotted on the chart FIG. 6A against the $\overline{Y}$-axial average cell sizes $\overline{y}$. The coordinates representing the foam specimens satisfying the objects of the present invention are marked with o, while those representing the specimens not satisfying the objects of the present invention are marked with X.

As seen in FIG. 6A, the foams as intended by the present invention must have such $\overline{Y}$-axial average cell sizes $\overline{y}$ and bulk densities D that fall in the pentagonal domain defined by five coordinates (1.0, 43), (1.0, 20), (0.05, 24), (0.05, 60) and (0.1, 60) and, more preferably, in the tetragonal domain defined by the coordinates (0.8, 42), (0.8, 23), (0.07, 26) and (0.07, 57). The bulk densities D and $\overline{Y}$-axial cell sizes $\overline{y}$ of these foams satisfy the following formula:

$$-17 \log \overline{y} + 43 \geq D \geq -3 \log \overline{y} + 20$$

(where $20 \leq D \leq 60$ and $0.05 \leq \overline{y} \leq 1$) and more preferably;

$$-15 \log \overline{y} + 40 \geq D \geq -3 \log \overline{y} + 23$$

(where $20 \leq D \leq 60$ and $0.07 \leq \overline{y} \leq 0.8$).

EXAMPLE 2

Two-Direction Flexibilization

Using the same commercial polystyrene resin A and procedures of Example 1, a variety of foam planks were prepared about 110 mm×350 mm in cross-section, axial cell size ratios $\overline{y}/\overline{x}$ and $\overline{y}/\overline{z}$ about 1.1 to 1.25 and 1.1 to 1.17, respectively, while the Y-axial cell size and bulk density d are varied in the range of 0.07 to 1.6 mm and 21.5 to 77 kg/m³, respectively. Those foams lighter than about 21 kg/m³ are subjected to secondary expansion by exposing them to steam at 100° C. for 2 to 6 minutes resulting in a bulk density of about 15.5 to 20 kg/m³. Skins are removed from each of the foams to obtain a skinless foam board of about 100 mm×300 mm in cross-section and 2,000 mm in length. These resultant foam planks are mechanically compressed for flexibilization in the direction of $\overline{X}$-axis first and then $\overline{Z}$-axially by using the equipment as shown in FIG. 5 and the typical conditions described above including aging for one day after extrusion.

Preferred Examples 201–212; Reference Examples R201–R206

As a result of the compression process, flexibilized foam planks of the Preferred Examples 201–212 and Reference Examples R201–R206 having almost constant cell shapes with the axial cell size ratios y/x and y/z ranging from 1.2 to 1.4 are obtained. Then these flexibilized planks are evaluated by the standard procedures with typical results shown in Table 2.

TABLE 2

| | | | Two-Directional Flexibilization | | | | | | |
| --- | --- | --- | --- | --- | --- | --- | --- | --- | --- |
| | Foam Density (Kg/m³) | Y-axial Cell Size $\overline{y}$ (mm) | Cell Shape | | Y-axial Compressive Strength | Tensile Strength Variation | | Y-axial Thermal Conductivity | Overall* Evaluation |
| | | | y/x | y/z | | X-axial | Z-axial | | |
| Preferred Example No. | | | | | | | | | |
| 201 | 42.1 | 0.80 | 1.38 | 1.25 | Go | Go | Go | Go | Ex |
| 202 | 55.1 | 0.80 | 1.39 | 1.33 | Go | Go | Go | Go | Ex |
| 203 | 23.5 | 0.80 | 1.29 | 1.26 | Go | Go | Go | Go | Ex |
| 204 | 20.0 | 1.0 | 1.24 | 1.21 | Pa | Pa | Pa | Pa | Go |
| 205 | 55.0 | 1.0 | 1.38 | 1.22 | Go | Pa | Pa | Go | Go |
| 206 | 60.2 | 0.20 | 1.39 | 1.27 | Go | Go | Go | Go | Ex |
| 207 | 93.1 | 0.25 | 1.38 | 1.30 | Go | Go | Go | Go | Ex |
| 208 | 25.0 | 0.10 | 1.33 | 1.25 | Pa | Go | Go | Go | Go |
| 209 | 28.8 | 0.07 | 1.31 | 1.26 | Go | Go | Go | Go | Ex |
| 210 | 93.0 | 0.07 | 1.34 | 1.26 | Go | Go | Go | Go | Ex |
| 211 | 100.4 | 0.09 | 1.31 | 1.27 | Go | Pa | Pa | Go | Go |
| 212 | 99.8 | 0.25 | 1.36 | 1.28 | Go | Pa | Pa | Go | Go |
| Reference Example No. | | | | | | | | | |
| R201 | 21.0 | 0.12 | 1.30 | 1.26 | Un | Go | Go | Go | Un |
| R202 | 17.5 | 1.01 | 1.26 | 1.25 | Un | Pa | Pa | Un | Un |
| R203 | 41.5 | 1.60 | 1.35 | 1.28 | Go | Un | Un | Un | Un |
| R204 | 62.1 | 0.99 | 1.37 | 1.30 | Go | Pa | Un | Go | Un |
| R205 | 94.5 | 0.45 | 1.37 | 1.32 | Go | Pa | Un | Go | Un |
| R206 | 108.0 | 0.11 | 1.30 | 1.22 | Go | Un | Un | Go | Un |

Ex - Excellent;
Go - Good;
Pa - Passable;
Un - Unacceptable

Figure 6B:
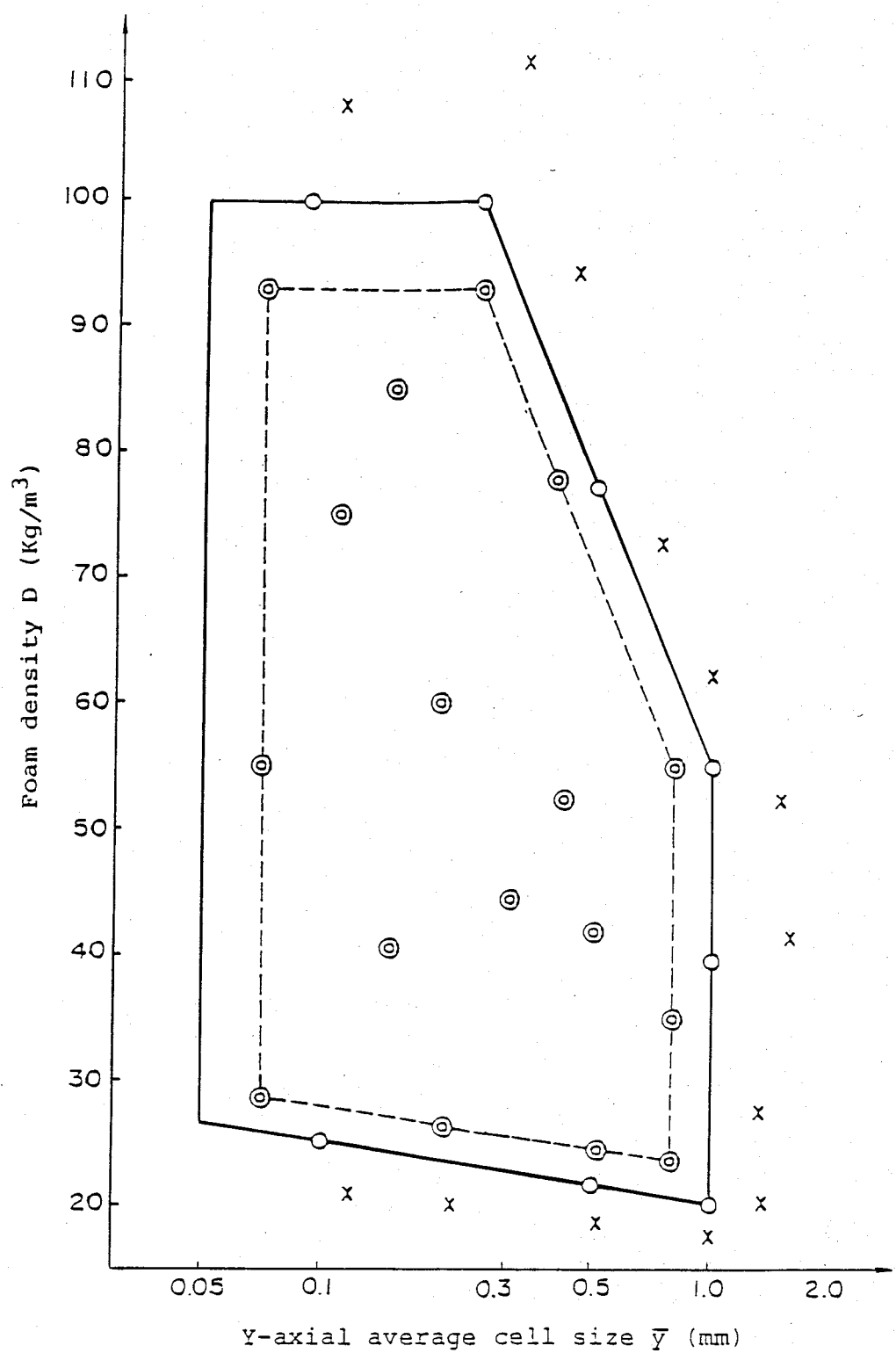

Based on typical results as shown in Table 2, the bulk densities D are plotted on the chart of FIG. 6B against the Y-axial average cell sizes $\overline{y}$, in which the coordinates representing the foam specimens evaluated as excellent and good in Table 2 are marked with O and o, respectively, while those evaluated as unacceptable being marked with X.

As seen in the chart of FIG. 6B, the foams as intended by the present invention must have such y-axial average cell sizes $\overline{y}$ in mm and bulk densities D in kg/m³ that fall in the pentagonal domain defined by five coordinates (1.0, 55), (0.25, 100), (0.05, 100), (0.05, 26.5) and (1.0, 20) and, more preferably, in the pentagonal domain defined by five coordinates (0.8, 55), (0.25, 93), (0.07, 93), (0.07, 28.5) and (0.8, 23.5).

In other words, the foams contemplated by the present invention must have such a foam density D (kg/m³) and Y-axial average cell size $\overline{y}$ (mm) that satisfy the following formula:

$$-75 \log \overline{y} + 55 \geq D \geq -5 \log \overline{y} + 20$$

(where about $20 \leq D \leq$ about 100, $0.05 \leq \bar{y} \leq 1$) or more preferably;

$$-75 \log \bar{y} + 48 \geq D \geq -5 \log \bar{y} + 23$$

(where about $23 \leq D \leq$ about 93, $0.07 \leq \bar{y} \leq 0.08$).

EXAMPLE 3

Flexibilization Time

In normal practice, rigid thermoplastic foam sheets are aged for at least several weeks before use to stabilize the foam structure. During the development of the flexibilized foam for cryogenic insulation, it was discovered that the age of the extruded foam at the time of compression flexibilization profoundly influenced the resulting foam properties.

Using foam sheet extruded from polystyrene resin A and cut to standard 25 mm and 100 mm thick pieces, the effect of flexibilization time was examined for both one- and two-direction flexibilization. Typical results are shown graphically in FIGS. 7 and 8 with the A series being one-directional ($\bar{X}$-axial) flexibilization and the B series being two-directional ($\bar{X}$-axial, then $\bar{Z}$-axial) flexibilization.

A. One-Directional Flexibilization

Figure 7A:
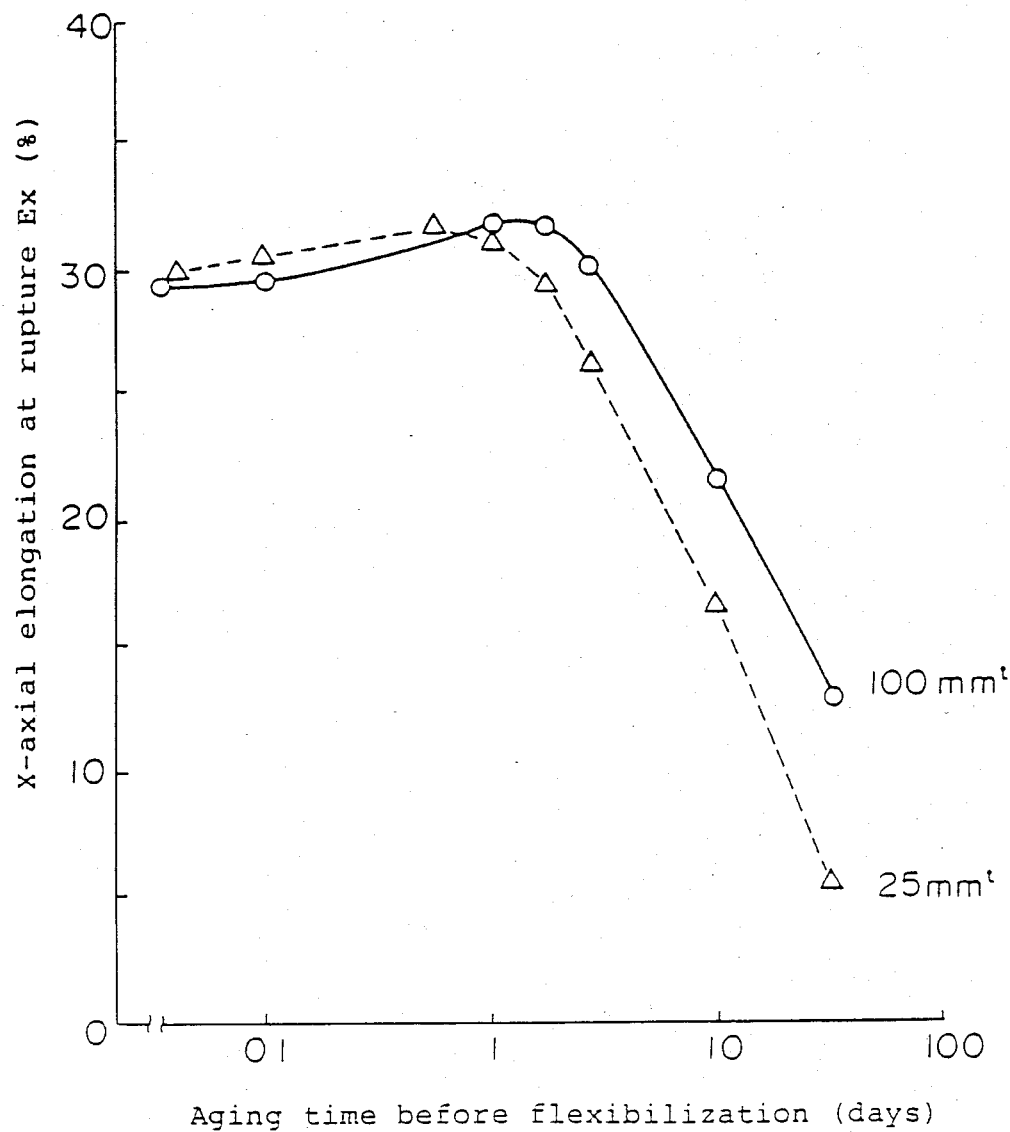
Figure 8A:
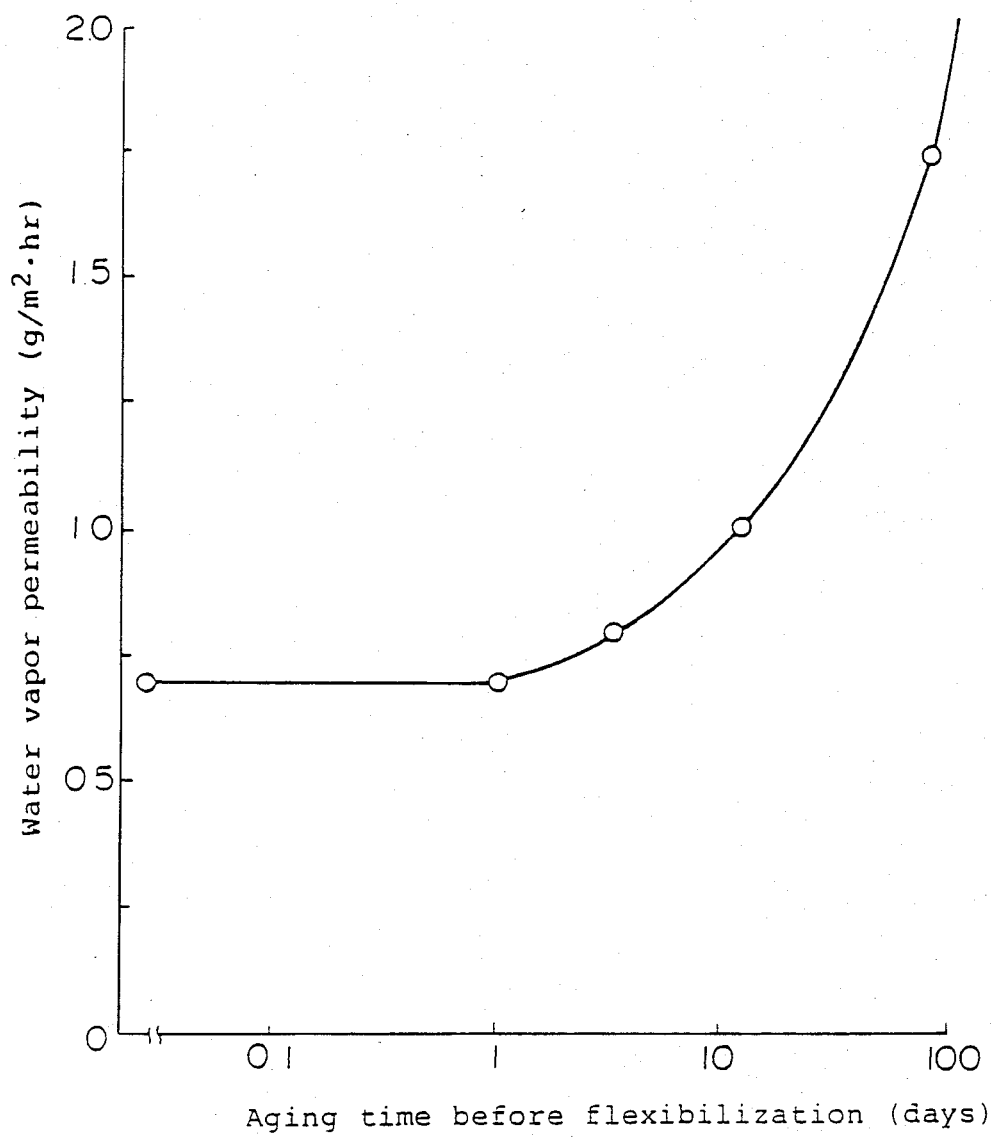

FIG. 7A shows the relation between $\bar{X}$-axial elongation at rupture Ex of the flexibilized foams and the aging period of the initial foam sheet after extrusion, while FIG. 8A shows the relation between water vapor permeability and the aging period before flexibilization. It is evident that to obtain the improved elongation and water vapor barrier properties intended by the present invention, it is necessary that the aging period for the foams prior to compression flexibilization be not more than 10 days (240 hrs) and more preferably, 3 days (72 hrs) or less.

B. Two-Directional Flexibilization

Figure 7B:
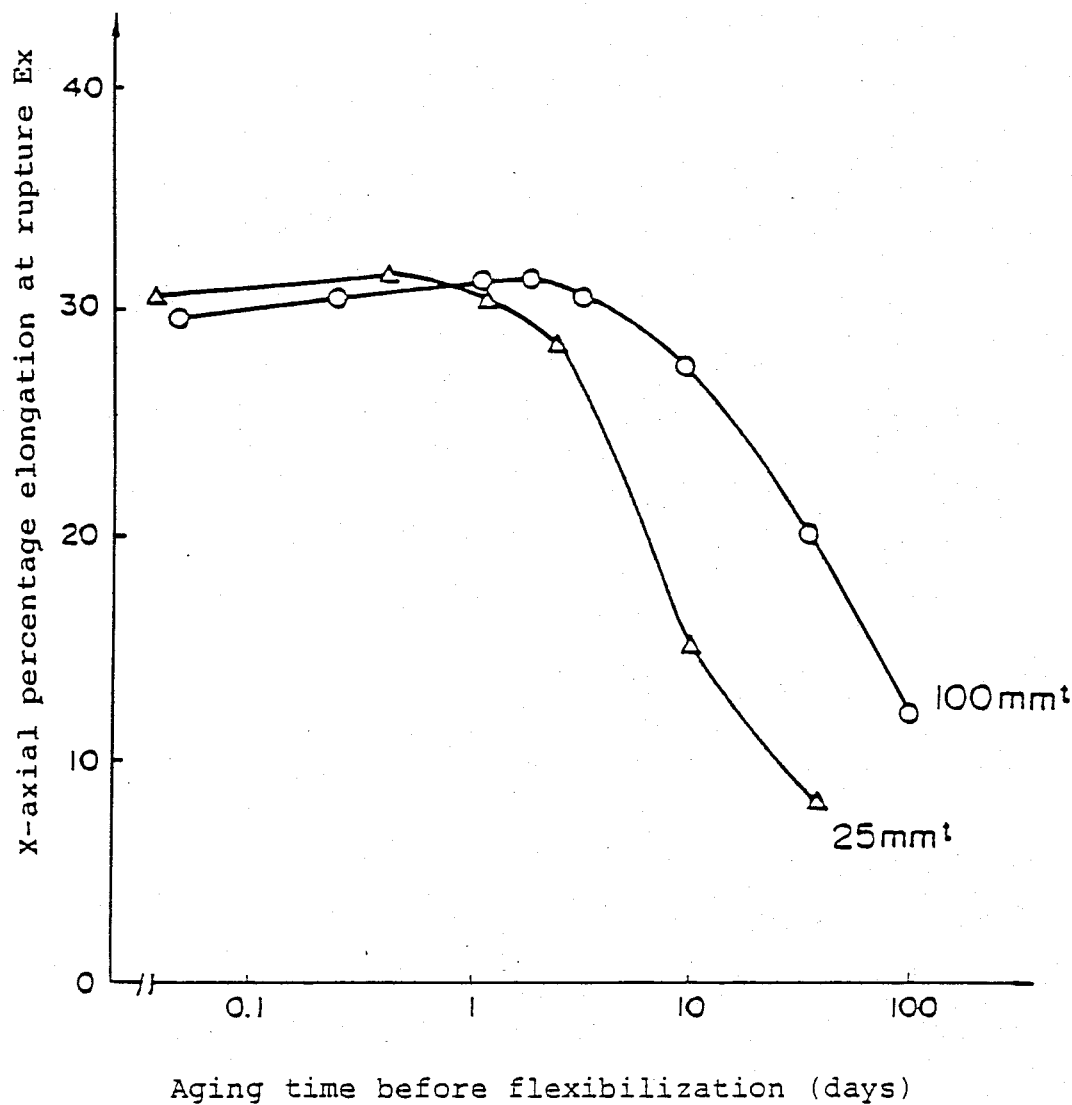

FIG. 7B shows a relation between the $\bar{X}$-axial percentage elongation at rupture Ex of two-directionally flexibilized foams and the aging time of the extruded foam planks. Note that aging affects the $\bar{X}$-axial and $\bar{Z}$-axial percentage elongations at rupture substantially equally. The initial fresh foam planks had a density of about 27 kg/m$^3$, thickness of about 100 mm, and $\bar{X}$, $\bar{Y}$- and $\bar{Z}$-axial average cell sizes of about 0.55 mm, 0.72 mm and 0.58 mm, respectively. After being cut to a thickness of 25 mm, the foams were subjected to one cycle of 37 percent compression $\bar{X}$-axially first and then $\bar{Z}$-axially at varied aging times. The $\bar{Z}$-axial percentage elongations at rupture Ez ranges from about 80 to 90 percent of the $\bar{X}$-axial percentage elongation at rupture Ex. In FIG. 7B, the axial percentage elongations at rupture are representatively given as the $\bar{X}$-axial percent-elongation at rupture Ex.

Figure 8B:
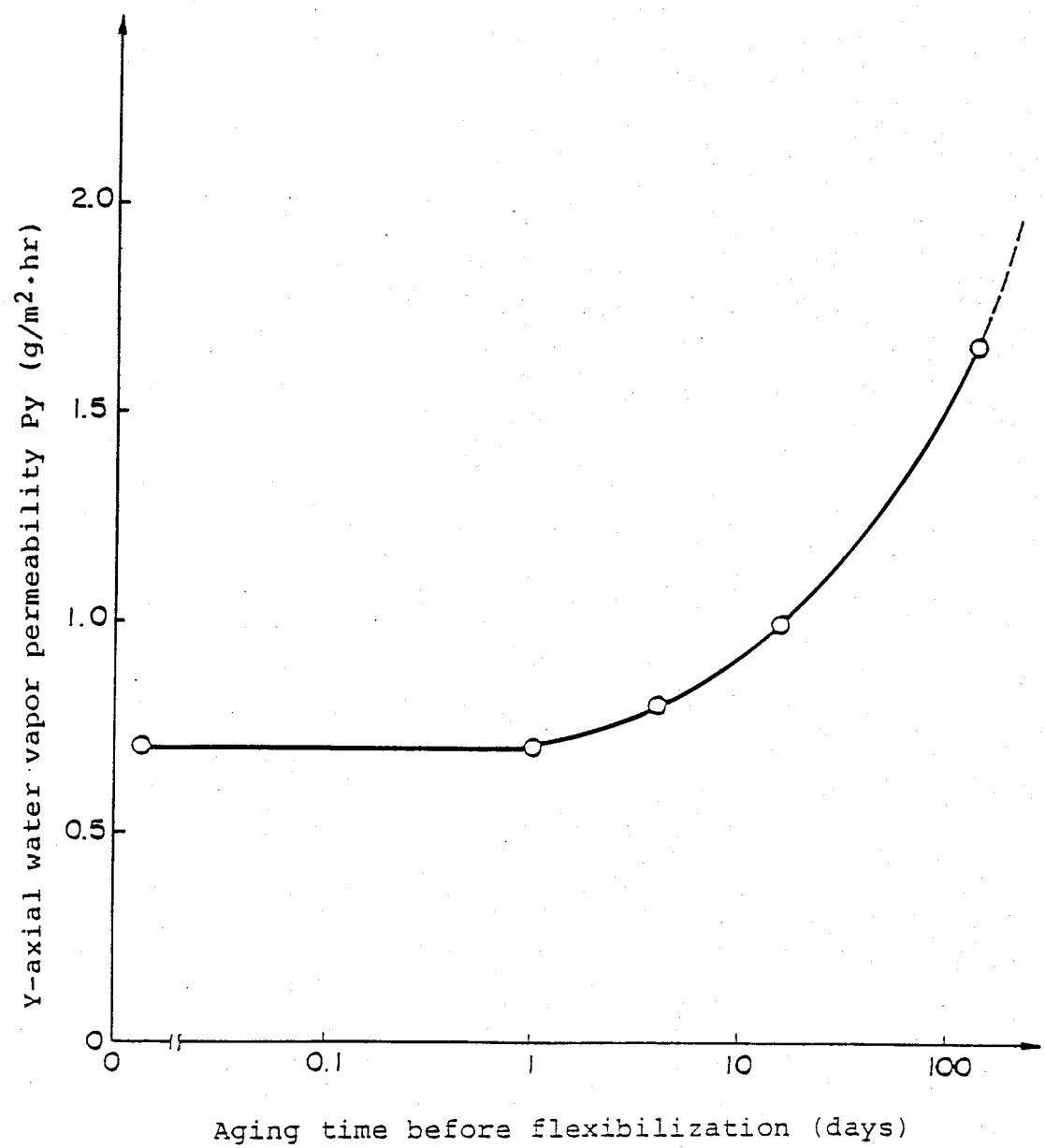
Figure 9A:
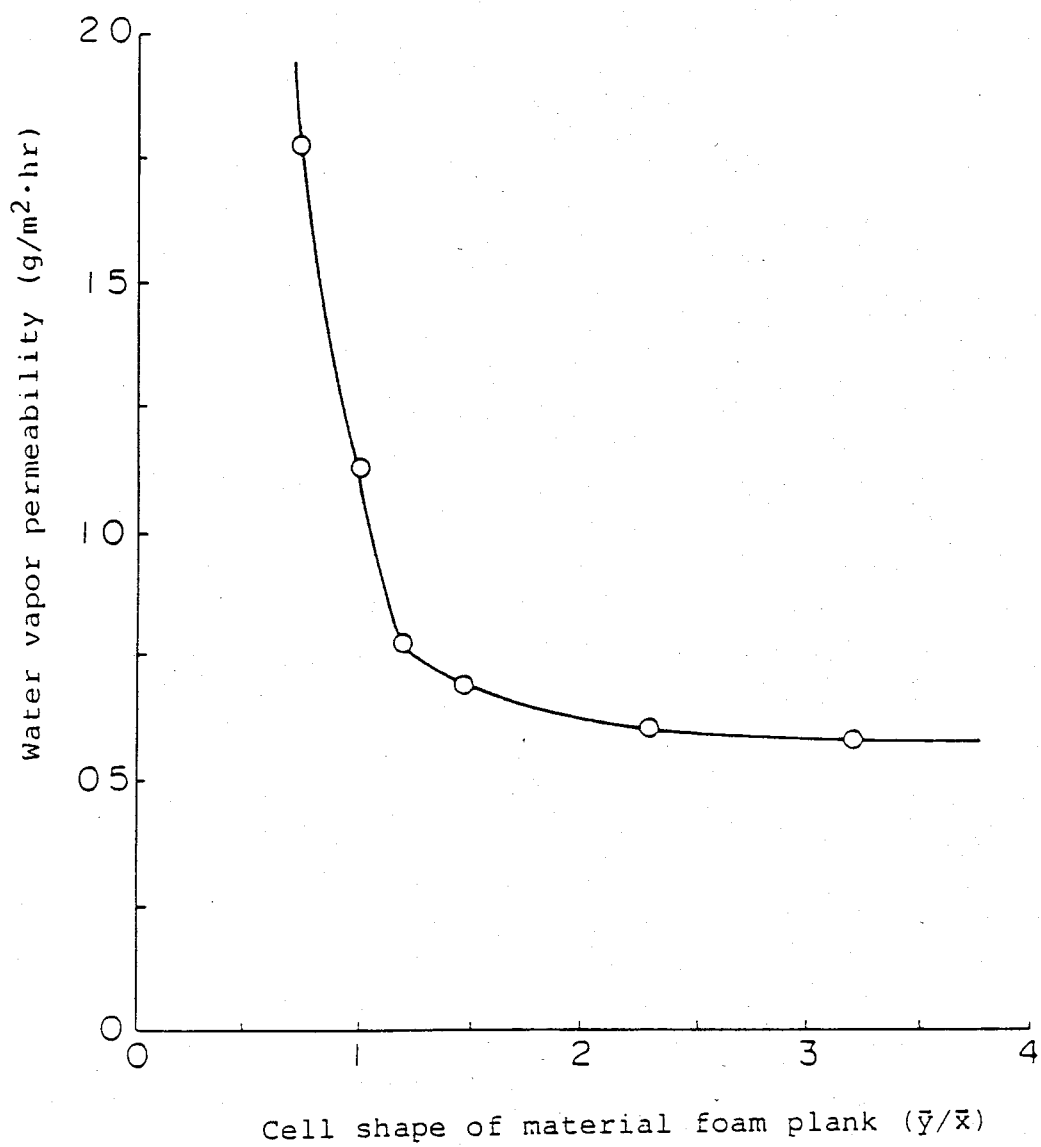
Figure 9B:
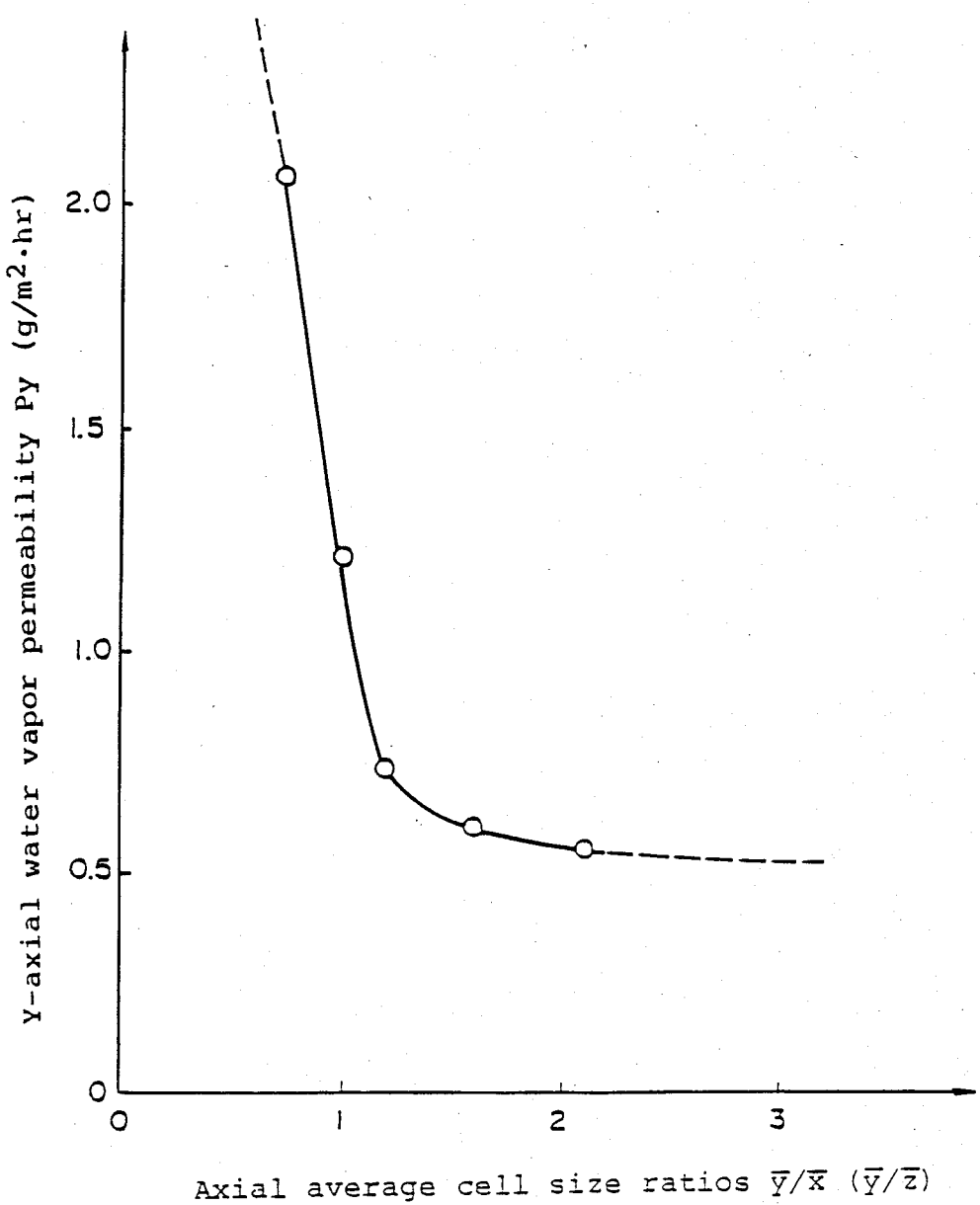

FIG. 8B shows a relationship between the water vapor permeability Py of flexibilized foams and the aging period of the material foams after expansion thereof. The foam planks have the same density and axial average cell sizes as those above. Test pieces about 25 mm thick were cut and subjected to 20-37 percent compression applied one to three times in each direction. The resulting foams had an $\bar{X}$-axial percentage elongation at rupture Ez of about 20 percent and $\bar{Z}$-axial percentage elongation at rupture Ez of about 16 percent.

Again it is clear that to obtain desired properties, the foam should be flexibilized while fresh, i.e., within 10 days or more preferably 3 days of extrusion and/or expansion. This applies especially to relatively thin foams as represented by the 25 mm thick samples used in the preceding experiments. The optimum time within the range of about 0.25-240 hours will, of course, depend on the specific properties of the initial foam and the desired results.

EXAMPLE 4

Water Vapor Permeability

Critical for low temperature insulation is the ability of the foam to be an effective barrier to the transfer of water vapor from the outer to inner surface of the insulation.

A. One-Directionally Flexibilized Foam: Preferred Examples 121-132 + Reference Examples R121-126

Using the same equipment and methods, flexibilizable foam planks were expanded from PS Resin A under controlled conditions so that the resultant foams had densities D in the range of about 22.5 to 51 kg/m$^3$, $\bar{Y}$-axial cell sizes $\bar{y}$ in the range of about 0.07 to 1.0 mm and axial cell size ratios $\bar{y}/\bar{x}$ and $\bar{y}/\bar{z}$ of about 1.35 to 2 and about 1.1-1.3, respectively. Then the resultant foam planks were cut to 100 mm square and 4,000 mm long and after aging for one day were compressed $\bar{X}$-axially. Typical properties including water vapor permeability for these flexibilized foams are given in Table 3.

TABLE 3

| | | | | | | | | | | |
|---|---|---|---|---|---|---|---|---|---|---|
| | | | One-Directional Flexibilization | | | | | | | |
| | | Y-axial Cell Size | Cell Shape | | Percentage Elongation at Rupture (%) | | Y-axial Water Permability Py | Thermal Conductivity with | X-axial Tensile | Cryogenic Resis- | Overall* Evalu- |
| | Density Kg/m$^3$ | $\bar{y}$ (mm) | $\bar{y}/\bar{x}$ | $\bar{y}/\bar{z}$ | E | Ex | (g/m$^2$ hr) | Time | Strenth | tance | ation |
| Preferred Example No. | | | | | | | | | | | |
| 121 | 29.4 | 0.52 | 2.1 | 1.08 | 4.1 | 7.0 | 0.5 | Go | Go | Pa | Go |
| 122 | 33.1 | 0.52 | 2.36 | 1.08 | 7.0 | 22.5 | 0.6 | Go | Go | Go | Ex |
| 123 | 35.2 | 0.52 | 2.5 | 1.08 | 8.3 | 30.0 | 0.65 | Go | Go | Go | Ex |
| 124 | 39.2 | 0.52 | 2.8 | 1.09 | 10.6 | 51.5 | 1.0 | Go | Go | Go | Ex |
| 125 | 44.8 | 0.52 | 3.2 | 1.07 | 12.5 | 67.0 | 1.5 | Pa | Go | Go | Go |
| 126 | 27.2 | 0.45 | 1.8 | 1.14 | 9.3 | 24.7 | 0.75 | Go | Go | Go | Ex |
| 127 | 32.5 | 0.45 | 2.2 | 1.15 | 10.0 | 54.7 | 1.5 | Pa | Pa | Go | Go |
| 128 | 35.5 | 0.21 | 1.6 | 1.22 | 5.3 | 8.0 | 0.35 | Go | Go | Go | Ex |
| 129 | 47.6 | 0.21 | 2.13 | 1.23 | 10.2 | 56.5 | 1.0 | Go | Go | Go | Ex |
| 130 | 46.6 | 0.11 | 1.58 | 1.30 | 4.5 | 7.1 | 0.3 | Go | Go | Pa | Go |
| 131 | 30.1 | 0.08 | 1.51 | 1.36 | 6.8 | 15.1 | 0.6 | Go | Go | Go | Ex |
| 132 | 56.9 | 0.07 | 1.7 | 1.34 | 7.1 | 15.5 | 0.2 | Go | Go | Go | Ex |
| Ref- | | | | | | | | | | | |

TABLE 3-continued

| | | | | | One-Directional Flexibilization | | | | | | |
|---|---|---|---|---|---|---|---|---|---|---|---|
| | Density Kg/m³ | Y-axial Cell Size ȳ (mm) | Cell Shape | | Percentage Elongation at Rupture (%) | | Y-axial Water Permability Py (g/m² hr) | Thermal Conductivity with Time | X-axial Tensile Strenth | Cryogenic Resistance | Overall* Evaluation |
| erence Example No. | | | ȳ/x̄ | ȳ/z̄ | E | Ex | | | | | |
| R121 | 28.0 | 0.52 | 2.02 | 1.07 | 3.5 | 4.1 | 0.5 | Go | Go | Un | Un |
| R122 | 45.7 | 0.52 | 3.3 | 1.08 | 11.5 | 70.5 | 1.6 | Un | Go | Go | Un |
| R123 | 48.1 | 0.52 | 3.48 | 1.09 | 12.5 | 78.0 | 1.8 | Un | Go | Go | Un |
| R124 | 35.1 | 0.45 | 2.33 | 1.14 | 12.5 | 70.5 | 2.4 | Un | Pa | Go | Un |
| R125 | 33.5 | 0.21 | 1.51 | 1.23 | 3.5 | 4.0 | 0.35 | Go | Go | Un | Un |
| R126 | 24.3 | 1.0 | 1.9 | 1.15 | 12.1 | 42.0 | 2.2 | Un | Pa | Go | Un |

Ex - Excellent;
Go - Good;
Pa - Passable;
Un - Unaccetable

Based on such typical results as shown in Table 3, the flexibilized foam of the present invention must have a water vapor permeability of 1.5 g/m²·hr or lower as determined by the water method of ASTM C-355.

FIGS. 1A, B and C are photomicrographs (magnification: 50×) of the polystyrene foam of the preferred example 123 showing closed cells distributed as viewed in the X-, Y- and Z-directions shown in FIG. 3. Note that the flexibilized foams of the present invention have a unique structural anistropy in which wrinkles in the cell walls observed in the $\overline{YZ}$-plane (FIG. 1A) are significantly fewer than those observed in the $\overline{XZ}$- and $\overline{XY}$ planes (FIGS. 1B and 1C). Since the foam cells are very small and have polyhedral shapes, it is very difficult to express the distribution and locations of such wrinkles accurately. However, considering the relations between Ex, E and the $\overline{Y}$-axial water vapor permeability Py with reference to FIG. 1, these relationships provide fairly accurate structural parameters of the wrinkles including their type, location and distribution.

B. Two-Directionally Flexibilized Foam: Preferred Examples 221–227+Ref. Examples R221–R225

Using the same PS Resin A, equipment and methods of Example 1 foam planks having the same cross-sections were extruded and expanded with a density of 27 kg/m³ or 50 kg/m³ and Y-axial average cell size of 0.61 mm or 0.11 mm with ȳ/x̄ of 1.20 or 1.15 and ȳ/z̄ of 1.25 or 1.20. These foam planks were compressed for flexibilization $\overline{X}$-axially first and then $\overline{Z}$-axially by using the equipment as shown in FIG. 5. Then the foam densities D and other properties including the $\overline{Y}$-axial water permeability Py of the thus biaxially-flexibilized foams are measured. Also, the changes in Y-axial thermal conductivity as well as the X-axial and Z-axial cryogenic resistance at −160° C. and −196° C. are observed. Typical results are shown in Table 4.

TABLE 4

| | | | | | Two-Directional Flexibilization | | | | | |
|---|---|---|---|---|---|---|---|---|---|---|
| Example No. | Foam Density (kg/m³) | Y-Axial Cell Size ȳ (mm) | Cell Shape | | Percentage Elongation at Rupture (%) | | | | | Water Vapor Permeability (g/m²H) |
| | | | ȳ/z̄ | ȳ/z̄ | X-axial Ex | Z-axial Ez | Y-axial Ey | Ex/Ey | Ez/Ey | |
| Preferred | | | | | | | | | | |
| 221 | 30.0 | 0.61 | 1.26 | 1.21 | 8.0 | 8.0 | 3.6 | 2.22 | 2.22 | 0.53 |
| 222 | 31.7 | — | 1.30 | 1.24 | 12.0 | 12.0 | 4.5 | 2.67 | 2.67 | 0.65 |
| 223 | 35.9 | — | 1.42 | 1.29 | 22.0 | 15.5 | 5.4 | 4.07 | 2.87 | 0.78 |
| 224 | 45.1 | — | 1.63 | 1.40 | 40.2 | 26.5 | 7.2 | 5.58 | 3.68 | 1.18 |
| 225 | 48.3 | 0.61 | 1.44 | 1.70 | 23.5 | 52.3 | 7.4 | 3.18 | 7.07 | 1.31 |
| 226 | 58.3 | 0.11 | 1.36 | 1.30 | 12.1 | 12.0 | 4.0 | 3.02 | 3.0 | 0.43 |
| 227 | 53.7 | 0.61 | 1.52 | 1.80 | 30.3 | 60.5 | 7.9 | 3.84 | 7.66 | 1.50 |
| Reference | | | | | | | | | | |
| R221 | 29.1 | 0.61 | 1.25 | 1.18 | 7.3 | 6.7 | 3.8 | 1.92 | 1.76 | 0.50 |
| R222 | 57.4 | 0.61 | 1.58 | 1.84 | 36.5 | 64.0 | 8.0 | 4.56 | 8.0 | 1.65 |
| R223 | 44.7 | 0.61 | 1.90 | 1.20 | 62.8 | 7.7 | 7.3 | 8.60 | 1.05 | 1.20 |
| R224 | 38.2 | 0.61 | 1.62 | 1.20 | 38.7 | 7.3 | 6.5 | 5.95 | 1.12 | 0.9 |
| R225 | 32.8 | 0.61 | 1.40 | 1.18 | 20.6 | 6.8 | 5.2 | 3.96 | 1.31 | 0.7 |

| Example No. | Thermal Conductivity Variation in Ex | Variation in Ez | Change With Time | Cryogenic Test −160° C. | | −196° C. | | Overall** Evaluation |
|---|---|---|---|---|---|---|---|---|
| | | | | X-axial | Z-axial | X-axial | Z-axial | |
| Preferred | | | | | | | | |
| 221 | Pa | Pa | Go | Go | Go | Pa | Pa | Go |
| 222 | Go | Go | Go | Go | Go | Go | Go | Ex |
| 223 | Go | Go | Go | Go | Go | Go | Go | Ex |
| 224 | Go | Go | Pa | Go | Go | Go | Go | Go |
| 225 | Go | Go | Pa | Go | Go | Go | Go | Go |
| 226 | Go | Go | Go | Go | Go | Go | Go | Ex |
| 227 | Go | Go | Go | Pa | Go | Go | Go | Go |

TABLE 4-continued

| Reference | Two-Directional Flexibilization | | | | | | | |
|---|---|---|---|---|---|---|---|---|
| R221 | Pa | Pa | Go | Pa | Un | Un | Un | Un |
| R222 | Go | Go | Un | Go | Go | Go | Go | Un |
| R223 | Go | Pa | Pa | Go | Pa | Go | Un | Un |
| R224 | Go | Pa | Go | Go | Pa | Go | Un | Un |
| R225 | Go | Pa | Go | Go | Pa | Go | Un | Un |

Ex - Excellent;
G - Good;
Pa - Passable;
Un - Unacceptable

Table 4 shows that the foams of this invention must have a $\overline{Y}$-axial water vapor permeability Py equal to or smaller than 1.5 g/m²·hr to prevent or minimize deterioration in thermal-insulating properties over a long period of use. More preferably, the water vapor permeability should be 1.0 g/m²·hr or smaller to secure a higher level of thermal-insulation.

For applications involving such severe conditions as encountered in liquid nitrogen gas tanks and for ensuring improved heat-insulating properties over a longer period, the preferred foams of the present invention must also satisfy the following conditions:

$$Ez \leq 52 - Ez$$
$$8.3 \geq Ex/Ey \geq 1.8,\ 8.3 \geq Ex/Ey \lambda 1.8$$
$$Ex + Ez < 12\ Ey$$
where $40 \geq Ex \geq 12$ and $40 \geq Ez \geq 12$; and
$$Py \leq 1.0$$

FIGS. 2A, B and C are photomicrographs (magnification: 50×) of the flexibilized polystyrene foam of Preferred Example 223 showing the closed cells viewed in the $\overline{X}$, $\overline{Y}$ and $\overline{Z}$ directions shown in FIG. 3. Note that the foam is characterized by structurally anisotropic cell walls. Those visible in the $\overline{YZ}$ and $\overline{XY}$ planes shown in FIGS. 2A and 2C are generally wavy only in one direction, namely in the $\overline{Z}$-axial and $\overline{X}$-axial directions respectively, but not in the $\overline{Y}$-axial direction.

Such anisotropically distributed cell wall wrinkles in combination with the foam density as well as with the sizes and shapes of cells are important structural parameters of the foams of the present invention, in view of the aforementioned relationship between Ex and Ez, and ratios of axial percentage elongations at rupture (Ex/Ey, Ez/Ey) and Y-axial water vapor permeability that represent the distribution and directions of such wrinkles.

EXAMPLE 5

Cryogenic Insulation

A. One-Directionally Flexibilized Foam

Surprisingly, an experiment has revealed that when wound around a steel drum and heated at about 80° C. foams having the desired improved elongation properties and water vapor barrier properties can be shaped to the drum curvature and can be fixed to that shape. Still the winding requires no large force and entails only a minimum reduction in the thermal-insulating properties.

Table 5 shows the results of experiments on still another group of the preferred examples of the present invention and several reference foams. Since these evaluation items are substantially representative of the bendability, applicability to curved surfaces, adhesion workability, cryogenic insulating properties and other characteristics practically required to such foams, Table 5 does give overall evaluation for practical applicabilities of such foams.

Further, to minimize multi-axial strains of the foams after application or to improve the thermal-insulating properties effectively, two or more such foams may be bonded so that the resultant foam logs show biaxial extensibility or they may be clad with metal foils or they may be combined with synthetic resin films having high gas barrier properties.

TABLE 5

| | | | Cryogenic Insulation | | | | |
|---|---|---|---|---|---|---|---|
| Example No. | Density (kg/m³) | Y-axial Cell Size y (mm) | Cell Shape y/x | Cell Shape y/z | Elongation at Rupture (%) E | Elongation at Rupture (%) Ex | X-axial Water Permeability Py (g/m²H) |
| Preferred | | | | | | | |
| 141 | 30.5 | 0.52 | 2.18 | 1.07 | 5.5 | 13.5 | 0.53 |
| 142 | 39.2 | 0.52 | 2.8 | 1.09 | 10.6 | 51.5 | 1.0 |
| 143 | 35.5 | 0.48 | 2.52 | 1.10 | 8.1 | 31.5 | 0.70 |
| 144 | 53.5 | 0.18 | 2.85 | 1.28 | 12.3 | 70.8 | 1.5 |
| Reference | | | | | | | |
| R141 | 38.8 | 1.33 | 1.45 | 1.10 | 9.8 | 44.0 | 1.6 |
| R142 | 28.8 | 0.75 | 0.95 | 1.25 | 7.5 | 23.0 | 1.6 |
| R143 | 28.0 | 0.52 | 2.02 | 1.07 | 3.5 | 4.1 | 0.5 |
| R144 | 51.8 | 0.52 | 3.74 | 1.08 | 14.2 | 90.5 | 2.4 |
| R145 | 40.6 | 0.58 | 1.68 | 1.07 | 10.2 | 42.0 | 1.7 |
| R146 | 32.5 | 0.61 | 1.34 | 1.10 | 6.0 | 15.3 | 0.6 |

| Example | Density Varia- | Y-axial Cell Size y | Compressive Strength (kg/cm²) | X-axial Tensile Strength Varia- | Elongation, Varia- | Thermal Conductivity Change with | Cryogenic Resis- | Overall Evalu- |
|---|---|---|---|---|---|---|---|---|

TABLE 5-continued

| No. | tion | (mm) | Y-axial | Z-axial | Strength | tion | tion | Time | tance | ation |
|---|---|---|---|---|---|---|---|---|---|---|
| | | | | | Cryogenic Insulation | | | | | |
| Preferred | | | | | | | | | | |
| 141 | Go | Go | Go | Go | Go | Go | Go | Go | Go | Ex |
| 142 | Go | Go | Go | Go | Go | Go | Go | Go | Go | Ex |
| 143 | Go | Go | Go | Go | Go | Go | Go | Go | Go | Go |
| 144 | Go | Go | Go | Go | Go | Go | Go | Pa | Go | Go |
| Reference | | | | | | | | | | |
| R141 | Go | Un | Go | Go | Go | Un | Un | Un | Go | Un |
| R142 | Go | Go | Go | Go | Un | Un | Un | Un | Go | Un |
| R143 | Go | Go | Go | Go | Go | Go | Go | Go | Un | Un |
| R144 | Go | Go | Go | Go | Un | Go | Go | Un | Go | Un |
| R145 | Un | Pa | Go | Go | Go | Go | Un | Un | Go | Un |
| R146 | Pa | Un | Go | Go | Go | Go | Un | Go | Go | Un |

*Ex - Excellent;
Go - Good;
Pa - Passable;
Un - Unacceptable

B. Two-Directionally Flexibilized Foam

To determine the applicability to cured surfaces such as pipings, cylindrical or spherical tanks, workability including bendability and foamability, and performance as cryogenic thermal-insulating materials, selected foams, namely the foams of preferred examples 222-225 and of the references R221, R223-225 are applied, respectively, onto a steel pipe of about 114 mm in outside diameter as a typical representative of cylindrical pipes having a very large curvature. The foams were sliced to a thickness of 25, 37.5 or 75 mm and applied in one, two or three layers to obtain an overall thickness of 75 mm. The longitudinal and circumferential seams of the semi-cylindrical foams sections applied in layers are butted, while those of the foam sections 77 mm thick are shiplapped.

The bendability, thermoformability to the bent forms, cryogenic heat-insulating properties and crack resistance thereof are tested and typical results are given in Table 6.

TABLE 6

| Foams Tested Example No. | Flex[a] | Layers[b] | Workability | | Thermal Insulating Properties | Crack Resistance 1st Layer | | |
|---|---|---|---|---|---|---|---|---|
| | | | Bendability | Thermoformability | | Longitudinal | Circum. | Other Directions |
| | | | | | Cryogenic Insulation | | | |
| Preferred | | | | | | | | |
| 222 | 2D | 2 × 37.5 | Go | Go | Go | Go | Go | Go |
| 223 | 2D | 2 × 37.5 | Go | Go | Go | Go | Go | Go |
| 223 | 2D | 1 × 75 | Go | Go | Go | Go | Go | Go |
| 224 | 2D | 1 × 75 | Go | Go | Go | Go | Go | Go |
| 224 | 2D | 2 × 37.5 | Go | Go | Go | Go | Go | Go |
| 225 | 2D | 2 × 37.5 | Go | Go | Go | Go | Go | Go |
| 225 | 2D | 1 × 75 | Go | Go | Go | Go | Go | Go |
| Reference | | | | | | | | |
| R221 | 2D | 3 × 25 | Pa | Pa | Un | Un | Un | Un |
| R221 | 2D | 2 × 37.5 | Un | — | — | — | — | — |
| R223 | 1D | 2 × 37.5 | Go | Go | Pa | Go | Un | Pa |
| R223 | 1D | 1 × 75 | Go | Go | Un | Go | Un | Pa |
| R224 | 1D | 1 × 75 | Go | Go | Un | Go | Un | Pa |
| R224 | 1D | 2 × 37.5 | Go | Go | Pa | Go | Un | Pa |
| R225 | 1D | 2 × 37.5 | Go | Go | Pa | Go | Un | Pa |
| R225 | 1D | 1 × 75 | Go | Go | Un | Go | Un | Pa |

| Foams Tested Example No. | Crack Resistance 2nd Layer | | | Overall Evaluation |
|---|---|---|---|---|
| | Longitudinal | Circum. | Oblique | |
| Preferred | | | | |
| 222 | Go | Go | Ex | |
| 223 | Go | Go | Go | Ex |
| 223 | — | — | — | Ex |
| 224 | — | — | — | Ex |
| 224 | Go | Go | Go | Ex |
| 225 | Go | Go | Go | Ex |
| 225 | — | — | — | Ex |
| Reference | | | | |
| R221 | Un | Un | Un | Un |
| R221 | — | — | — | Un |
| R223 | Go | Pa | Go | Un |
| R223 | — | — | — | Un |
| R224 | — | — | — | Un |
| R224 | Go | Pa | Go | Un |
| R225 | Go | Pa | Go | Un |

TABLE 6-continued

| | Cryogenic Insulation | | | |
|---|---|---|---|---|
| R225 | — | — | — | Un |

[a]1D = one directionally flexibilized, 2D = two directionally flexibilized.
[b]Number of layers × thickness (mm).
Ex = Excellent;
Go = Good;
Pa = Passable;
Un = Unacceptable.

The synthetic resin foams of the present invention having larger extensibility in two axial directions show excellent bendability, thermoformability and applicability to pipes having small diameters. They can be easily applied to such small-diameter pipes and can be easily thermoformed to their bent shapes. Further, because of substantial freedom from crack formation in bending operation or under cryogenic conditions, the synthetic resin foams according to the present invention can provide excellent cryogenic thermal-insulating materials free from moisture condensation even at −196° C. which are generally applicable to pipes, cylindrical and spherical tanks.

Although the reference foams compressed only X-axially or Z-axially have satisfiable bendability and thermoformability, they are not entirely satisfactory as cryogenic thermal-insulation because they may break under cryogenic conditions due to cracks spreading circumferentially of the pipe or in other directions. Such cracks form because these foams do not have sufficient extensibility to absorb stresses generated by sudden changes between the room and cryogenic temperatures.

EXAMPLE 6

Thermoplastic Resin Foams

The improved flexibilization process is applicable to a variety of thermoplastic resin foams, both extruded and expanded.

A. Commercial PS Resin A is a thermally polymerized polystyrene resin having an intrinsic viscosity of about 0.83 dissolved in toluene at 30° C. and containing 0.20 weight percent residual volatiles including styrene monomer and 0.87 weight percent oligomers including styrene trimer. Blends with other polystyrene resins richer in residual styrene monomer and trimer were flexibilized with typical results shown in Table 7. For such thermally polymerized polystyrene resins, preferred resins for the flexibilized foams are those containing 0.3 weight percent or less of residual volatiles including styrene monomer and 0.5–1.5 weight percent of styrene oligomers including trimer.

TABLE 7

| Ex. No. | PS Resin[1] | | Thermoplastic Resin Foams | | | | Overall[2] Evaluation |
|---|---|---|---|---|---|---|---|
| | | | Bulk Density (kg/m³) | | Y-axial Cell Size (mm) | | |
| | % Vol. | % Olig. | Average | Variation | Average | Variation | |
| Pfd | | | | | | | |
| 151 | 0.20 | 0.87 | 28.7 | Go | 0.55 | Go | Ex |
| 152 | 0.21 | 0.69 | 28.8 | Go | 0.54 | Go | Ex |
| 153 | 0.21 | 0.50 | 29.0 | Pa | 0.57 | Go | Go |
| 154 | 0.07 | 0.50 | 28.7 | Pa | 0.53 | Go | Go |
| 155 | 0.30 | 1.50 | 29.2 | Go | 0.63 | Pa | Go |
| Ref. | | | | | | | |
| R151 | 0.41 | 0.52 | 28.7 | Pa | 0.60 | Un | Un |
| R152 | 0.34 | 1.37 | 29.0 | Pa | 0.61 | Un | Un |
| R153 | 0.12 | 0.38 | 28.9 | Un | 0.61 | Pa | Un |

[1]Polystyrene Resin:
% Volatiles — % Oligomers
[2]Ex = Excellent;
Go = Good;
Pa = Passable;
Un = Unacceptable B. Instead of the polystyrene foams used in the foregoing examples, two commercially-available polyvinyl chloride foams (Klegecell ®33 produced by Kanegafichi Chemical Co., Ltd. and Rockecell Board ® produced by Fuji Kasei Co., Ltd.) and a methyl methacrylate resin foam (made experimentally by Asahi-Dow Limited) cut to 50×600×900 (mm), 25×600×900 (mm) and 50×300×900 (mm), respectively, are compressed under conditions typically given above.

The resultant flexibilized foams are tested and evaluated with typical results shown in Table 8. Thus, the present invention is applicable also to foams expanded from polyvinyl chloride resins including blends thereof with inorganic materials, methyl methacrylate and the like resins other than polystyrene, and the resulting flexibilized foams satisfy the requirements of the present invention.

C. A batch of prefoamed polystyrene beads having a bulk density of 11.6 kg/m³ is placed in a mold, and steam is heated for about 40 seconds under pressure of 3 kg/cm². The resulting foam was aged at about 70° C. for 12 hours. It had a density of 10.9 kg/m³ with $\bar{x}$ of 0.33 mm, $\bar{y}$ of 0.31 mm and $\bar{z}$ of 0.32 mm. Three 350-mm cubes are cut out from its central portion by means of an electrically-heated wire cutter.

One sample was flexibilized $\bar{X}$-axially by compression to 90 percent of its original volume by applying 40 kg/cm² pressure with a 50-ton press. The compression was repeated continuous six times by relieving the pressure immediately after its application. The compressed foam has the size of 350×350×262 (mm) with a density of 14.5 kg/m³.

The other samples were similarly flexibilized in two- and three-directions. All were subjected to the standard tests and failed to meet one or more of the desired results contemplated by the present invention. Note also that none had the requisite initial foam density.

TABLE 8

Thermoplastic Resin Foams

| Example No. | Resin (a) | Foam Density (kg/m³) | Y-axial Average Cell Size ȳ (mm) | Cell Shape ȳ/x̄ | Cell Shape ȳ/z̄ | Percentage Elongation At Rupture (%) Ex | Ez | Ey | Ex/Ey | Ez/Ey | Water Vapor Permeability (g/m²·hr) |
|---|---|---|---|---|---|---|---|---|---|---|---|
| Preferred | | | | | | | | | | | |
| 231 | PVC | 53 | 2.1 | 1.75 | 1.70 | 18.7 | 16.6 | 3.2 | 5.84 | 5.20 | 0.25 |
| 232 | PVC | 67 | 2.0 | 1.88 | 1.82 | 29.0 | 3.5 | 4.7 | 6.17 | 6.70 | 0.50 |
| 233 | PVC | 100 | 1.63 | 1.20 | 1.13 | 32.5 | 30.0 | 14.7 | 2.2 | 2.0 | 1.45 |
| 234 | PMMA | 45.7 | 0.55 | 1.43 | 1.47 | 15.2 | 17.2 | 4.1 | 3.7 | 4.2 | 0.85 |
| Reference | | | | | | | | | | | |
| R231 | PSB | 14.5 | 0.31 | 1.35 | 1.03 | 33.0 | 7.5 | 7.7 | 4.29 | 0.97 | 1.7 |

| Example No. | Resin | Y-axial Compressive Strength | Tensile Strength X-axial | Tensile Strength Z-axial | Tensile Strength Variation X-axial | Tensile Strength Variation Z-axial | Y-axial Thermal Conductivity | Variation in Ex |
|---|---|---|---|---|---|---|---|---|
| Preferred | | | | | | | | |
| 231 | PVC | Go | Go | Go | Go | Go | Go | Pa |
| 232 | PVC | Go | Go | Go | Go | Go | Go | Pa |
| 233 | PVC | Go | Go | Go | Go | Go | Go | Go |
| 234 | PMMA | Go | Go | Go | Go | Go | Go | Pa |
| Reference | | | | | | | | |
| R231 | PSB | Un | Un | Go | Un | Un | Pa | Un |

| Example No. | Variation in Ex | Thermal Conductivity Change with Time | Cryogenic Resistance −160° C. X-Y Plane | −160° C. Z-Y Plane | −196° C. X-Y Plane | −196° C. Z-Y Plane | Overall* Evaluation |
|---|---|---|---|---|---|---|---|
| Preferred | | | | | | | |
| 231 | Pa | Go | Go | Go | Go | Go | Go |
| 232 | Pa | Go | Go | Go | Go | Go | Go |
| 223 | Go | Pa | Go | Go | Go | Go | Go |
| 234 | Pa | Go | Go | Go | Go | Go | Go |
| Reference | | | | | | | |
| R231 | Un | Un | Go | Un | Go | Un | Un |

(a) PVC = polyvinyl chloride;
PMMA = polymethyl methacrylate;
PSB = polystyrene beads.
*Ex - Excellent;
Go - Good;
Pa - Passable;
Un - Unacceptable

We claim:

1. A process for flexibilization of a thermoplastic rigid, substantially closed-cell plastic foam sheet having a generally rectangular shape defined by the three-dimensional coordinates X (length), Y (thickness), Z (width) and the YZ, XZ and XY planes normal thereto by partial crushing of the foam sheet in a direction normal to the direction of desired flexibility, the improvement characterized by A. selecting a freshly expanded foam sheet having (1) a bulk density of 20 to 100 kg/m³, (2) an anisotropic cell structure oriented in the $\bar{Y}$-axial direction with an average ȳ cell size of 0.05 to 1.00 mm, (3) $\bar{Y}$-axial compressive strength of at least 1.8 kg/cm², and (4) the sheet having a thickness of from about 10 to about 300 millimeters;

B. compressing said foam sheet within 0.25 to 240 hours of expansion in a short confined compression zone having a maximum length of 300 millimeters for a period of at least one second to form a directionally flexibilized foam; and thereafter C. recovering of a directionally flexibilized foam having (1) anisotropically wrinkled cell wall structure with wrinkles in the direction of flexibilization;

(2) average cell sizes x̄, ȳ and z̄ measured in the axial directions $\bar{X}$, $\bar{Y}$ and $\bar{Z}$ satisfying the following conditions:

ȳ=0.05–1.0 mm, and

ȳ/x̄ and ȳ/z̄ ≧ 1.05;

(3) a higher elongation at rupture in the direction of flexibilization;

(4) a $\bar{Y}$-axial water vapor permeability of not more than 1.5 g/m²·hr by the water method of ASTM C-355, and (5) with the further limitation that the flexibilized sheet is of generally closed cell structure.

2. The process of claim 1 wherein the foam sheet is flexibilized within 72 hours of its expansion.

3. The process of claim 1 wherein the foam sheet is compressed in a confined compression zone not more than 300 mm long.

4. The process of claim 1 wherein the thermoplastic resin is polystyrene.

5. The process of claim 4 wherein the polystyrene resin contains 0.3 percent by weight or less of residual volatiles including styrene monomer and 0.5 to 1.5 percent by weight of styrene oligomers.

6. The process of claim 4 wherein the polystyrene resin foam is successively compressed in the longitudinal ($\overline{X}$-axial) and lateral ($\overline{Z}$-axial) directions to give a two-directionally flexibilized polystyrene foam sheet.

7. The directionally flexibilized closed-cell foam sheet prepared by the process of claim 1.

8. The flexibilized foam sheet of claim 7 wherein the thermoplastic resin is polystyrene.

9. A one-directionally flexibilized, substantially closed-cell polystyrene resin foam having a generally rectangular shape defined by the three dimensional coordinates X, Y and Z and an anisotropically wrinkled cell wall structure formed by partial crushing of the foam in a direction normal to the direction of flexibility further characterized by having (1) a bulk density of 20 to 60 kg/m³, (2) an anisotropic cell structure oriented in the $\overline{Y}$-axial direction with an average $\overline{y}$ cell size of 0.05 to 1.00 mm, (3) average axial cell sizes $\overline{x}, \overline{y}, \overline{z}$ satisfying the conditions: $\overline{y}/\overline{x}$ and $\overline{y}/\overline{z} \geq 1.05$; (4) a $\overline{X}$-axial elongation at rupture (Ex) of 7-70 percent, (5) a $\overline{Y}$-axial water vapor permeability (Py) of not more than 1.0 g/m²·hr by the water method of ASTM C-355, and (6) a thickness of from about 10 to about 300 millimeters.

10. A two-directionally flexibilized, substantially closed-cell thermoplastic resin foam having a generally rectangular shape defined by the three-dimensional coordinates X, Y, Z and an anisotropically wrinkled cell wall structure more highly wrinkled in the $\overline{XZ}$ plane further characterized by having (1) a density of 20 to 100 kg/m³;
(2) average axial cell sizes $\overline{x}, \overline{y}, \overline{z}$ measured in the axial directions X, Y, Z satisfying the following conditions:

$\overline{y} = 0.05-1.0$ mm, and $\overline{y}/\overline{x}$ and $\overline{y}/\overline{z} \geq 1.05$;

(3) the axial elongations at rupture (Ex, Ey, Ez) satisfy the conditions: Ex > 1.8 Ey and Ez < 8.3 Ey;
(4) a $\overline{Y}$-axial water vapor permeability of not more than 1.5 g/m²·hr by the water method of ASTM C-355, and
(5) a thickness of from about 10 to about 300 millimeters.

11. The flexibilized thermoplastic resin foam of claim 10 wherein the resin is polystyrene.

12. The flexibilized polystyrene resin foam of claim 9 or 11 wherein the polystyrene resin contains 0.3 percent by weight or less of residual volatiles including styrene monomer and 0.5 to 1.5 percent by weight of styrene oligomers.

* * * * *

UNITED STATES PATENT AND TRADEMARK OFFICE
CERTIFICATE OF CORRECTION

PATENT NO. : 4,510,268
DATED : Apr. 9, 1985
INVENTOR(S) : Hiroshi Tonokawa, Masao Nakamura It is certified that error appears in the above—identified patent and that said Letters Patent is hereby corrected as shown below:

On title page, under column heading Abstract, line 6,
"size size of" should read --size of--.
In column 3, line 29, "methy" should read --methyl--.
In column 5, line 13, "0.1" should read --0.25--; and on
line 59, "elongation" should read --elongations--.
In column 7, line 16, "the of $\bar{X}$" should read --the $\bar{X}$--.
In column 9, line 35, "2'C." should read --2 C.--.
In column 10, line 6, "The the pipe" should read --The pipe--;
and on line 53, "check" should read --checks--
At end of Column 12, Table I, page attached should be included.

In column 15, line 5, "0.08" should read --0.8--.
In column 16, line 54 in Table 3 in column heading "Density
Kg/m$^3$)" should read (Kg/m$^3$); and the 7th column heading also
line 54, "Strenth" should read --Strength--.
In column 17, line 7 Table 3 continued "Density Kg/m$^3$ should
read (Kg/m$^3$); and the 7th column heading also line 7,
"strenth" should read --strength--; and line 19, "Unaccetable"
should read --Unacceptable--.
In column 18, line 44, Table 4 heading Cell Shape "y$\bar{z}$ /y$\bar{z}$" should
read --y$\bar{x}$ /y$\bar{z}$--; line 61, "Overall**" should read --Overall*--.

Signed and Sealed this

Fifteenth Day of October 1985

[SEAL]

Attest:

DONALD J. QUIGG

Attesting Officer

Commissioner of Patents and
Trademarks—Designate

UNITED STATES PATENT AND TRADEMARK OFFICE
CERTIFICATE OF CORRECTION

PATENT NO. : 4,510,268
DATED : Apr. 9, 1985
INVENTOR(S) : Hiroshi Tonokawa, Masao Nakamura It is certified that error appears in the above-identified patent and that said Letters Patent is hereby corrected as shown below:

In column 19, line 10, "G-Good" should read --Go-Good--.
In column 20, line 13, "and" should read --the--.
In column 21, line 21, "cured" should read --curved--; and on line 23, "foamibility" should read --formability--.
In column 22, line 58, under column heading Oblique "ex" should read --Go-- and under Evaluation, same line, the blank space should read --Ex--.
In column 24, line 36, "Kanegafi" should read --Kanegafu--.
In column 25, of Table 8, line 12, under column heading Ez, "3.5" should read --31.5--.
In column 25, line 35, under heading Preferred, "223" should read --233--; and in line 56 "1.00mm,(3)" should read --1.00mm, and (3)--.

TABLE 1 (Continued)

| Reference Example No. | Density (kg/m³) | X-axial Cell Size $\bar{y}$ (mm) | Cell Shape $\bar{y}/\bar{x}$ | Compressive Strength Y-axial | Compressive Strength Z-axial | X-axial Elongation Variation | X-axial Tensile Strength Variation | Overall* Evaluation |
|---|---|---|---|---|---|---|---|---|
| R101 | 20.5 | 0.11 | 1.51 | Pa | Pa | Pa | Go | Un |
| R102 | 18.2 | 1.01 | 1.52 | Pa | Un | Un | Pa | Un |
| R103 | 19.9 | 1.32 | 1.46 | Pa | Pa | Un | Un | Un |
| R104 | 30.1 | 1.29 | 1.50 | Go | Go | Un | Un | Un |
| R105 | 38.8 | 1.33 | 1.45 | Go | Go | Pa | Un | Un |
| R106 | 46.2 | 1.02 | 1.48 | Go | Go | Un | Un | Un |
| R107 | 63.2 | 0.097 | 1.43 | Go | Go | Un | Un | Un |

* Ex – Excellent; Go – Good; Pa – Passable; Un – Unacceptable